United States Patent [19]
Rechtschaffen et al.

[11] Patent Number: 5,347,639
[45] Date of Patent: Sep. 13, 1994

[54] SELF-PARALLELIZING COMPUTER SYSTEM AND METHOD

[75] Inventors: Rudolph N. Rechtschaffen, Scarsdale; Kattamuri Ekanadham, Yorktown Heights, both of N.Y.

[73] Assignee: International Business Machines Corporation, Armonk, N.Y.

[21] Appl. No.: 731,224

[22] Filed: Jul. 15, 1991

[51] Int. Cl.$^5$ .................. G06F 9/30; G06F 15/16
[52] U.S. Cl. ..................... 395/375; 395/800; 364/231; 364/232.9; 364/259.9; 364/261.3; 364/269.4; 364/281.3; 364/DIG. 1
[58] Field of Search .................. 395/375, 800

[56] References Cited

U.S. PATENT DOCUMENTS

| | | | |
|---|---|---|---|
| 4,484,272 | 11/1984 | Green. | |
| 4,903,196 | 2/1990 | Pomerene et al. | |
| 5,016,163 | 5/1991 | Jesshope et al. | 395/800 |
| 5,021,945 | 6/1991 | Morrison et al. | 395/375 |
| 5,127,104 | 6/1992 | Dennis | 395/650 |
| 5,197,137 | 3/1993 | Kumar et al. | 395/375 |

FOREIGN PATENT DOCUMENTS 0243892 11/1987 European Pat. Off. .
0394624 10/1990 European Pat. Off. .

OTHER PUBLICATIONS

Science, vol. 253, No. 5025, Sep. 13, 1991, Washington, D.C. US, J. A. Fisher et al., "Instruction-level Parallel Processing", p. 1238, left column, paragraph 3, paragraph 8.

Supercomputers:Design and Applications, 1984, pp. 186-203, J. R. Allen et al., "PFC:A program to convert fortran to parallel form", p. 192, right hand column, lines 23-49, p. 196, left hand column, lines 16-49.

COMPCON 87, San Francisco, Calif., Feb. 23, 1987, pp. 177-180, IEEE, New York, US; J. A. Fisher; "A new architecture for supercomputing" p. 179, left hand column, line 22; p. 180, left hand column, line 36.

Proceedings of the 1986 International Conference on Parallel Processing, Univeristy Park, Pa., Aug. 19-22 1986, pp. 729-736, IEEE, New York, US; A. K. Uht et al. "Hardware extraction of low-level concurrency from serial instruction streams", p. 733, left-hand column, line 14—right hand column, line 13.

*Primary Examiner*—Parshotham S. Lall
*Assistant Examiner*—Ayni Mohamed
*Attorney, Agent, or Firm*—Ronald L. Drumheller; Richard M. Ludwin

[57] ABSTRACT

A self-parallelizing computer system and method asynchronously processes execution sequences of instructions in two modes of execution on a set of processing elements which communicate with each other. Each processing element is capable of decoding instructions, generating memory operand addresses, executing instructions and referencing and updating its own set of general purpose registers. These processing elements act in concert during the first mode of execution not only to execute the instructions in an execution sequence but also to partition an execution sequence into separate instruction subsequences. The separate instruction subsequences are stored along with additional information which will allow the stored subsequences to be correctly executed in parallel. Subsequent re-execution of the same execution sequence is done much faster in the second mode of execution, since each of the processing elements decodes and executes only the instructions in one of the subsequences while the other processing elements are concurrently each doing the same with another one of the subsequences.

40 Claims, 12 Drawing Sheets

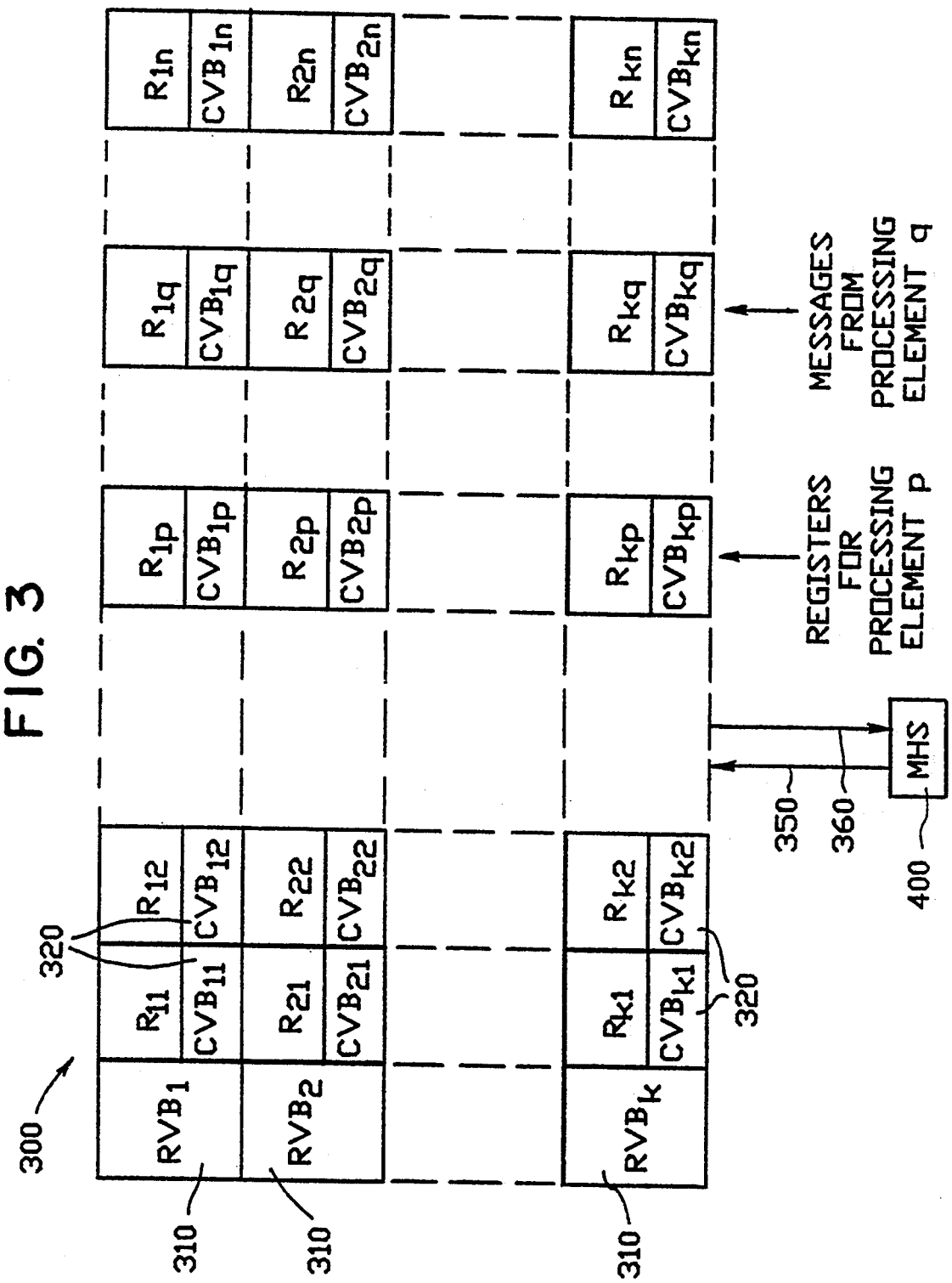

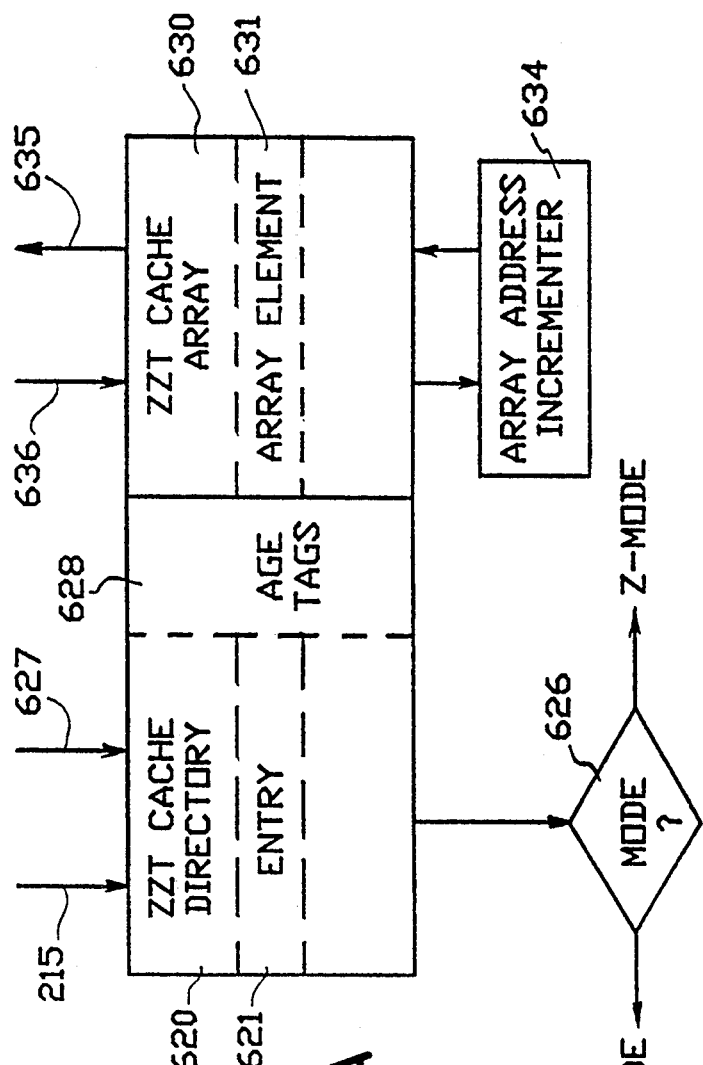
FIG. 6A
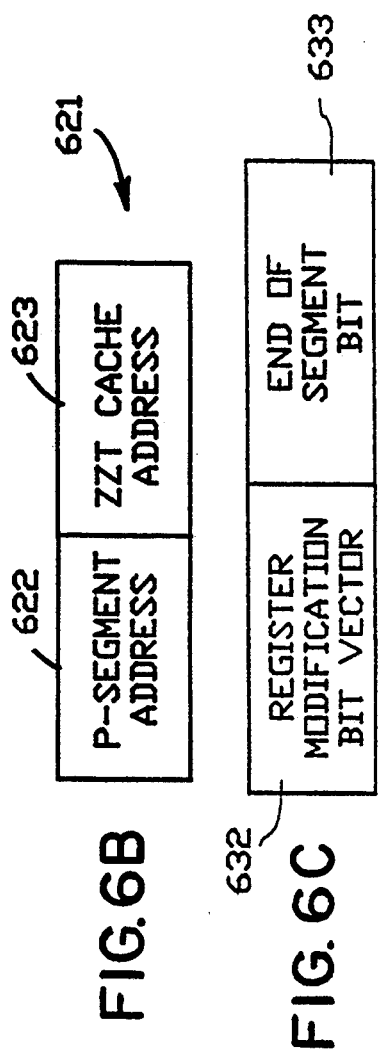
FIG. 6B
FIG. 6C

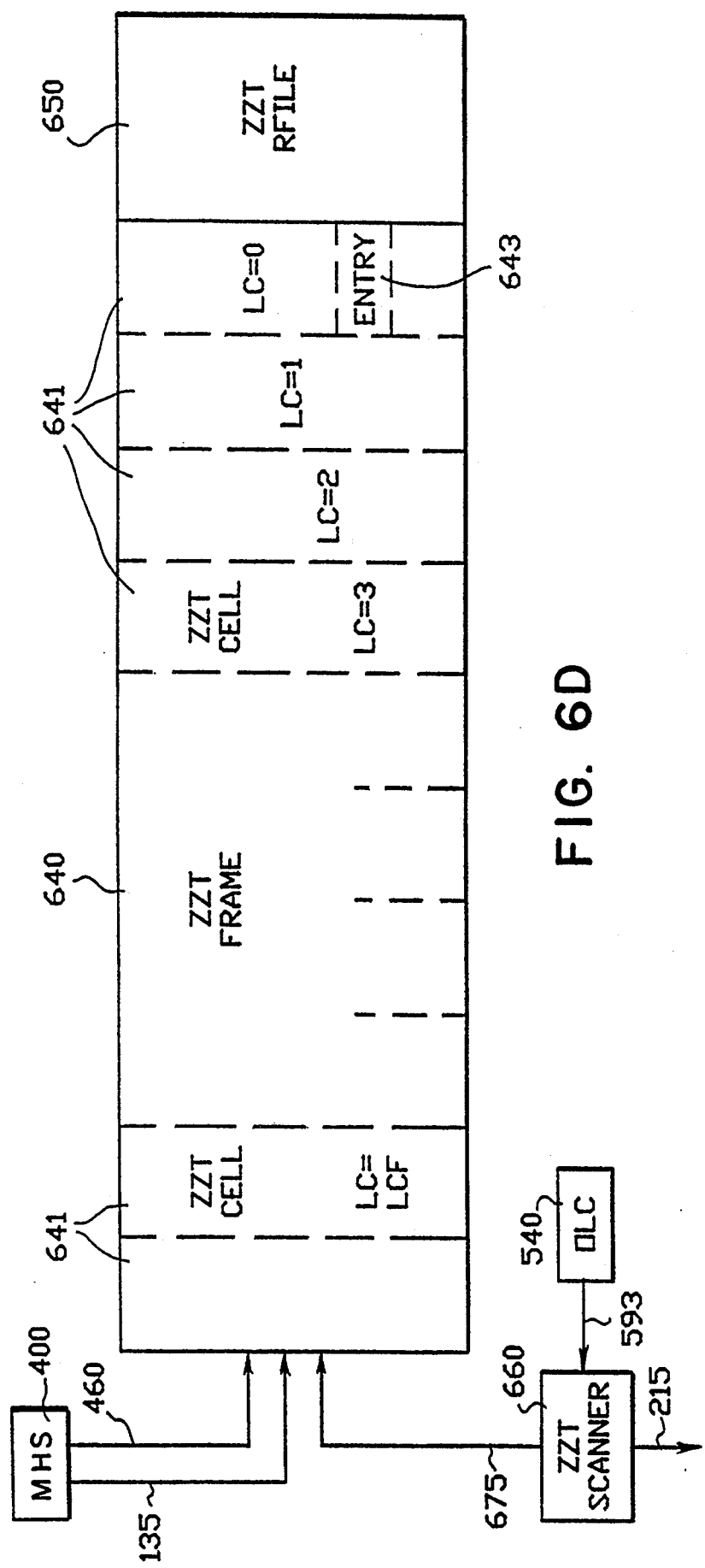

SELF-PARALLELIZING COMPUTER SYSTEM AND METHOD

BACKGROUND OF THE INVENTION

1. Field of the Invention

The present invention generally relates to stored program digital computers and more specifically to a computer system and method in which execution sequences of instructions are executed in two modes of execution, the first execution mode being used not only to execute instructions but also simultaneously to parallelize instruction sequences which have not already been parallelized, while the second mode is used to execute in parallel, on separate processing elements, instruction sequences which have been already parallelized. The present invention also relates to the parallelized form of the instruction sequences.

2. Description of the Prior Art

One way of executing a digital computer program faster is to execute several of its parts in parallel on separate processors. One way of doing this is to define a programming environment and computer system so that programs can be written for execution in such a parallel fashion. Unfortunately, many useful programs have been created already in which sequential execution of the instructions has been assumed. It is desirable to be able to execute these sequential programs faster also, so some effort has been made in the prior art to parallelize such programs for execution in parallel.

Most of the prior work in this area relies on creating a parallel specification of the program. This has been accomplished in several ways. Sophisticated compilers have been created which parallelize programs and generate code for a multi-processor system having a number of conventional processors. Some of these compilers uncover the parallelism automatically (e.g., "Advanced Compiler Optimizations for Supercomputers" by D. A. Padua and M. J. Wolfe in Comm. of ACM, Vol. 29, page 12 et seq., December 1986). Others take cues from programmer-supplied annotations (e.g., "Programming for Parallelism" by Alan H. Karp in Computer, Vol. 20, Page 5 et seq., May 1987). Another approach is to create specialized hardware that is amenable for parallel execution, such as vector processors, vliw architectures, etc. Here again a compiler translates sequential programs into code suitable for use on these machines. The compiling effort in these cases is substantial. A more radical approach has been to create an inherently parallel execution mechanism, such as a dataflow machine (See "Dataflow Supercomputers" by J. B. Dennis in Computer, Vol. 13, page 11 et seq., November 1980), and a declarative specification for a program which automatically generates parallel code for use on that mechanism (See "Future Scientific Programming on Parallel Machines" by Arvind and K. Ekanadham in the Jour. of Parallel & Distributed Computing, Vol. 5, December 1988).

In all of the foregoing approaches, the task of parallelizing the computer program and determining that it is safe to execute different parts in parallel is done either at the compiler level or even earlier at the programming level (i.e., ahead of any actual productive execution of the code with data). The processors play no role in determining whether it is safe to execute different parts in parallel at execution time because this determination has been made already by either the programmer or the compiler.

Another approach brings unparallelized code to a multi-processor system itself at execution time and gives the multi-processor system an active role in splitting up the code for parallel execution and in determining whether the parallel execution of the code is valid. This approach may be distinguished from the others in that execution of at least some of the instructions is done provisionally. It is not generally known ahead of execution whether the parallel execution is totally valid. A mechanism is provided for determining whether the parts executed in parallel are valid and if not the invalid parts are executed again.

This approach is exemplified in a patent application Ser. No. 342,494 entitled "Multiple Sequence Processor System" filed on Apr. 24, 1989 by the assignee of this patent application, in which instructions are divided into groups in accordance with some delimiting rule and then at least two groups are executed in parallel. One of the groups of instructions is sequentially earlier than all of the others and a correct execution of the earliest group is assumed, while the later groups are only provisionally executed in parallel. Later groups of instructions read data from registers and memory locations just as if earlier groups of instructions have already been executed. Controls monitor whether any data used by a later group of instructions is changed (after it has been used by the later group) by instructions in an earlier group. Stores to memory locations and registers by the later groups are done only temporarily in a separate place. If all of the data used by a later group is valid (i.e. not changed by an earlier group), the results of that later group are valid and can become committed. If not, that later group is re-executed.

In U.S. Pat. No. 4,825,360 a similar scheme is used in that instruction groups are being provisionally executed in parallel and then confirmed in sequence. However, in this scheme the chances for success have been enhanced through a compilation step and through a reduction (and preferable elimination) in side effecting instructions other than as the final instruction in a group. As a consequence, it is not clear that this system can be used to parallelize conventional sequential code.

In U.S. Pat. No. 4,903,196 (Pomerene et al.), a uniprocessor parallelizes code for execution on separate asynchronous execution units and the execution units wait for each other, if necessary, to avoid using data which will be modified by instructions earlier in conceptual order until those instructions have been executed. There is only one set of general purpose registers (GPRs) and only one decoder. A series of special purpose tags are associated with each GPR and execution unit in the uniprocessor. The tags allow the multiple execution units to be concurrently executing multiple instructions using the GPRs sequentially or different GPRs concurrently while at the same time preserving the logical integrity of the data supplied by the GPRs to the execution units. The tags associated with each GPR and each execution unit store a sequence trail between the individual GPRs and execution units so that before a given execution unit is permitted to store into a particular GPR, the immediately preceding store into that particular GPR by a different execution unit must have been completed. Also, the tags assure that all reads from a given GPR by one or more execution units are completed before a subsequent store operation to that GPR is allowed to occur.

SUMMARY OF THE INVENTION

It is an object of this invention to execute several portions of a computer program in parallel, while giving the appearance that the program has been executed sequentially.

Another object is to asynchronously execute several portions of a computer program in parallel while communicating operands correctly from each computer program portion producing an operand to the computer program portion(s) needing that operand.

Still another object is to execute a computer program in two modes of execution, the first mode being a sequential mode in which the system not only executes an instruction sequence but also "learns" how to execute that same instruction sequence in a second mode of execution which utilizes parallel processing, the second mode of execution being used thereafter as much as possible for executing that instruction sequence.

These and further objects are accomplished in accordance with this invention by a self-parallelizing computer system and method in which a single execution sequence of instructions is executed in successive segments and each segment is further partitioned into a set of instruction subsequences, each instruction subsequence being executed on a different one of a set of separate processing elements. This machine and method has been named MSIS (Multi-streaming a Single Instruction Sequence).

The processing elements store the necessary information in association with the instructions to allow them to execute asynchronously on the separate processing elements and to allow communication between processing elements so that the result of a parallel execution is correct. As such, a single instruction stream is dynamically parallelized relative to the execution of branches within that stream, which distinguishes it from other forms of parallel execution.

MSIS is a uniprocessor organization in which a set of processing elements working in concert execute successive segments of the instruction stream. Each processing element is capable of decoding instructions, generating memory operand addresses, executing instructions and referencing and updating its own set of general purpose registers. These processing elements act in concert during the first execution of a program segment to create separate instruction streams or instruction subsequences from the original segment and to store them. These separate instruction subsequences corresponding to a segment are a parallelized form of the original segment and are called Z-Code. This is a true partitioning in the sense that each instruction from the original segment is placed in only one of the created subsequences in the parallelized Z-Code form. Subsequent re-execution of the same program segment is much faster, since each of the processing elements decodes and executes only the instructions which have been assigned to it during the first execution of that segment and the other processing elements are concurrently doing the same for their own assigned instructions.

Segments are either P-Segments or Z-Segments. A P-Segment is a sequence of consecutively executed instructions (i.e., a normal segment of a uniprocessor instruction stream), which is processed in a first mode of execution (called "E-Mode") with data to produce not only the usual results of execution with data but also to produce one or more Z-Segments. If a program segment is executed again when the corresponding Z-Segment is available, the Z-Segment is processed by MSIS in place of the P-Segment in a second mode of execution (called "Z-Mode").

The main difference between E-Mode and Z-Mode is that during E-Mode all processing elements see all instructions in the P-Segments but only execute the instructions assigned to them. During Z-Mode each processing element not only executes only the instructions assigned to it but also only sees and decodes those instructions.

Since all processing elements see all instructions in E-Mode, this mode of processing makes all instruction interdependencies manifest to all processing elements and each records the information (as "Z-Code") it will require to execute properly in Z-Mode autonomously and asynchronously with respect to all the other processing elements. The Z-Code captures the interdependencies on an instruction by instruction basis for all instructions in a P-Segment.

In the Z-Mode, certain instructions executed on a processing element become the producers of register values that may be used by conceptually later consumer instructions executed on a different processing element. To assure sequential correctness from the perspective of the original instruction stream, MSIS creates producer-consumer synchronization by sending and awaiting messages. Whether an instruction is a producer, consumer, both, or neither is recorded in the Z-Code and used in the Z-Mode. To do this, the Z-Code associates with each instruction an S-List and a D-List.

An S-List instructs the processing element in the Z-Mode, that one or more of the source registers for an instruction are set by another instruction executing on another processing element. The D-List instructs the processing element in the Z-mode as to the names of the other processing elements that require the values of the register(s) that are set by an instruction. Correct execution in the Z-Mode occurs because each processing element knows from the Z-Code what information it needs from other processing elements to execute a particular instruction and if that information has not been sent to the processing element ahead of the execution of that instruction, the processing element waits for the needed information to be sent to it by the other processing elements before executing that particular instruction. Each processing element also knows from the Z-Code which information generated by that processing element will be needed by other processing elements to execute instructions, and the information required by other processing elements is sent to them by this processing element when the information is produced.

Segments in MSIS are further broken down into levels of conditionality. The level of conditionality of an instruction is the number of branch instructions that precede it in the segment. The level of conditionality starts at zero and is incremented following each branch instruction. The maximum number of levels of conditionality per segment is limited by the hardware resources in MSIS and a P-Segment in MSIS is terminated in the E-Mode before this limit is reached.

MSIS is a two pass system that generates Z-Code (during the first pass through an instruction sequence) which preserves the dependency between instructions that have been scheduled on different processors. The Z-Code enables the instruction sequence to re-execute correctly (in a second pass) with different data. Correct execution is accomplished by sending and anticipating messages that coordinate the setting and use of registers in the different processing elements. The need for these messages was determined during the E-Mode first pass execution and captured in the Z-Code.

Inherently the Z-Code which results from an E-Mode execution of a P-Segment depends upon the specific branch decisions (if any) which were made during the E-Mode execution of that instruction sequence (i.e., segment). Z-Code is recorded during an E-Mode execution in anticipation that the same instruction sequence might be totally or partially executed again and in such event that the Z-Code might be used in place of the original code (which is sometimes herein referred to as "E-Code") to execute the same instruction sequence again, at least in part, much more quickly in the parallelized Z-Mode of execution. Since computer programs tend to execute the same instruction sequences many times and branch instructions tend to be decided the same way on successive executions of the same branch, many instruction sequences (i.e., segments) are re-executed again and the branch instructions in re-executed instruction sequences are frequently decided the same way again upon re-execution, which is why performance is improved very much by creating Z-Code and executing it in place of E-Code whenever possible.

In the preferred embodiment, only data flows through registers (or register equivalents) is observed and recorded in the Z-Code and then recreated in the Z-Mode. If the E-Code stores data into main memory and then later reads the same data from main memory (as opposed to storing into a register and then later using the data in that register), this data flow is not recreated in the Z-Mode. It is assumed that data flows handled through a store to main memory will not often result in having one processing element need the data before the processing element that produces it has actually generated it. In the preferred embodiment, this unlikely error condition is detected if it occurs, but the correct data flow is not recreated through use of a D-List and S-List.

When one of these error conditions is detected, execution of Z-Code is halted, a valid machine state is restored and execution continues from the earlier point corresponding to the restored machine state in whatever mode is appropriate. It is assumed that it is within the capability of a processing element to avoid such errors if all of the instructions that are associated with such an error are located within the same level of conditionality in the same segment and are assigned to the same processing element. So in accordance with this invention, recovery from such an error preferably also includes a modification in the scheduling of instructions, so that when new Z-Code is produced as a consequence of the occurrence of an out-of-sequence error, the new Z-Code will not produce the same error when it executes.

In the preferred embodiment, each processing element has a set of not only its own registers but also a register set corresponding to each register set of each of the other processing elements (i.e., if there are 10 architected registers for each processing element and there are 8 processing elements, each processing element actually has 80 registers, 10 being used as the architected registers for that processing, element and 70 additional registers being used to hold register values from the other 7 processing elements). Correct data flow is maintained through use of a message handling system which transfers data among all those registers (i.e., in the previous example, among the 80 registers in each one of the 8 processing elements or among 640 registers in all).

If an instruction being handled in Z-Mode requires a value recorded in a register, that fact will have been recorded in the S-List associated with that instruction during the creation of the Z-Code being executed. The S-List also will identify the processing element that produces this value and the register in which that processing element will place the needed value. The processing elements needing that value will look for it in that identified particular one of their registers.

In the D-List associated with the instruction that produces this needed value will be a list of the other processing elements needing this value. When the value needed by other processing elements is produced, the processing element producing that value will know from the D-List associated with the instruction producing the needed value that other identified processing elements need that value. So the processing element producing the needed value will send it to the message handling system for delivery to the correct processing elements.

The message handling system transfers register values from the correct register of the processing element which produced it to the corresponding correct register(s) of the processing element(s) which need it. If a needed value is already stored in the correct register at a destination processing element, in accordance with the preferred embodiment, the message handling system stores the new value for that register until the value already held in that register is used and can be overwritten. The S-Lists and D-Lists allow all this to be done correctly and fully asynchronously.

Since some limit must be placed on the amount of Z-Code that can be stored, at some point a decision must be made, in a practical embodiment, as to which Z-Code to replace. This is much like the decision faced with each management and it is handled in the same way. In the preferred embodiment, an LRU (Least Recently Used) algorithm is applied to age out stored Z-Code.

In the preferred embodiment, a Z-Code segment can be entered only at the beginning (i.e., re-execution of an instruction sequence must start with the first instruction of the sequence). This imposes no great penalty because if a subsequent execution actually begins at some instruction other than the first instruction, the execution will be in E-Mode and new Z-Code will be produced for the portion of that instruction sequence which was re-executed in E-Mode. Since the prior Z-Code apparently was created with a starling instruction which did not turn out to be the correct starting instruction of a re-executed sequence, the prior Z-Code likely will age out and be replaced, while the new Z-Code will be reused and therefore will be retained. In this fashion, the Z-Code segments which are retained in the long run will be those having the correct instruction as a starting instruction.

Nevertheless, benefits are obtained by accommodating a direct branch into a Z-Code segment other than at the start of the Z-Code segment. This improvement to the MSIS machine and method is disclosed in a separate patent application entitled "SELF-ORGANIZING PARALLEL COMPUTER SYSTEM AND METHOD" by the same inventors as this patent application and filed on the same date as this patent application. While this co-pending application describes an invention which may be used advantageously in parallel processing applications apart from MSIS, the preferred implementation of that invention is as an improvement to MSIS. Accordingly, that co-pending application is hereby fully incorporated by reference.

In the event that a branch is not decided the same way on a subsequent execution in Z-Mode, the remainder of the stored instruction sequence is invalid for that particular re-execution. In accordance with this invention, however, a valid machine state is recovered at the point where the branch was decided differently during the execution of the Z-Code than was decided during the creation of the Z-Code and program execution continues in whatever mode of execution is appropriate (i.e., in Z-Mode if Z-Code exists and in E-Mode otherwise). The first time a new branch decision occurs, the machine will continue with an E-Mode execution that forms new Z-Code. Thereafter the new Z-Code will be available to continue execution in Z-Mode even when that branch is decided the new way.

A valid machine state needs to be established not only when a branch is guessed incorrectly in Z-Mode, but also at each transition between two segments. In the preferred embodiment, a storage element called the ZZT Frame is used to store the values of the architected registers of each processing element at each level of conditionality in a segment and another storage element called the ZZT RFILE is used to store the values of the architected registers of each processing element at the start of a segment. Additional hardware mechanisms are used to identify the latest branch instruction which was guessed correctly. When a valid machine state needs to be recreated, the values of the architected registers of each processing element at a valid state is obtained from these storage elements and used to restore correct values to the physical registers and execution proceeds again from that point in whatever mode is appropriate. Fetches and stores to main memory are committed only up to the point where branches have been executed correctly.

Although any processor architecture can be the base for each processing element, in the preferred embodiment of MSIS the processing elements are coordinated in the Z-Mode through the setting and use of registers (or the equivalent). Therefore the instructions preferably should use registers for at least most of the direct operations and for at least most interfacing with memory.

In the preferred embodiment, each processing element has a private Z-Cache in which Z-Code for that processing element is stored, but all processing elements access a common memory hierarchy for E-Code and data not stored in a register or the equivalent. The memory hierarchy is equipped with additional controls to assure that asynchronously occurring fetches and stores of operands do not violate architectural rules associated with the setting of values and inspection of values within the memory.

While some assignment schemes implemented in the E-Mode execution are better than others in terms of how efficiently MSIS will be able to execute the instruction stream in Z-Mode, MSIS will function correctly irrespective of the assignment scheme used. A perfectly suitable assignment scheme, for example, might be: 5 sequential instructions assigned to the first processing element, the next 5 sequential instructions assigned to the second processing element, etc. and repeating this assignment sequence again after assigning 5 sequential instructions to the last processing element until all of the instructions in the P-Segment have been assigned. A particular method for making this assignment, but which also has broader utility, is the subject of a separate patent application filed concurrently herewith and entitled "SELF-SCHEDULING PARALLEL COMPUTER SYSTEM AND METHOD", which is hereby fully incorporated by reference.

BRIEF DESCRIPTION OF THE DRAWINGS

The foregoing and other objects, aspects and advantages of the invention will be better understood from the following detailed description, which refers to the drawings, in which:

FIG. 3 illustrates a Register File for one of the processing elements in the preferred embodiment;

FIG. 4A is a block diagram of the OSC/PSC Controls which monitor out-of-sequence hazards in the preferred embodiment;

FIG. 6A is a block diagram of the ZZT Cache used to control and use the ZZT Frame and ZZT RFILE, which are all used to set register values upon a branch wrong guess or Segment transition;

FIG. 6B illustrates the format of an Entry in the ZZT Cache Directory;

FIG. 6C illustrates the format of an Element in the ZZT Cache Array;

FIG. 6D is a block diagram of the ZZT frame;

DETAILED DESCRIPTION OF A PREFERRED EMBODIMENT

The following description of the preferred embodiment of MSIS will be subdivided into 9 Sections, each principally referencing one or more figures having the same first number as the Section describing it. The description consists of the following Sections:

Section 1 OVERVIEW OF MSIS ORGANIZATION
Section 2 PRIVATE Z-CACHES
Section 3 SEPARATE REGISTER FILES
Section 4 MESSAGE PASSING BETWEEN PROCESSING ELEMENTS
Section 5 MONITORING FOR OPERAND STORE COMPARE
Section 6 HANDLING BRANCHES
Section 7 ASSIGNMENT OF INSTRUCTIONS TO PROCESSING ELEMENTS IN E-MODE
Section 8 INSTRUCTION PROCESSING DURING E-MODE AND DURING Z-MODE
Section 9 EXTENSIONS TO THE BASIC EMBODIMENT

SECTION 1 OVERVIEW OF A MSIS ORGANIZATION

Figure 1:
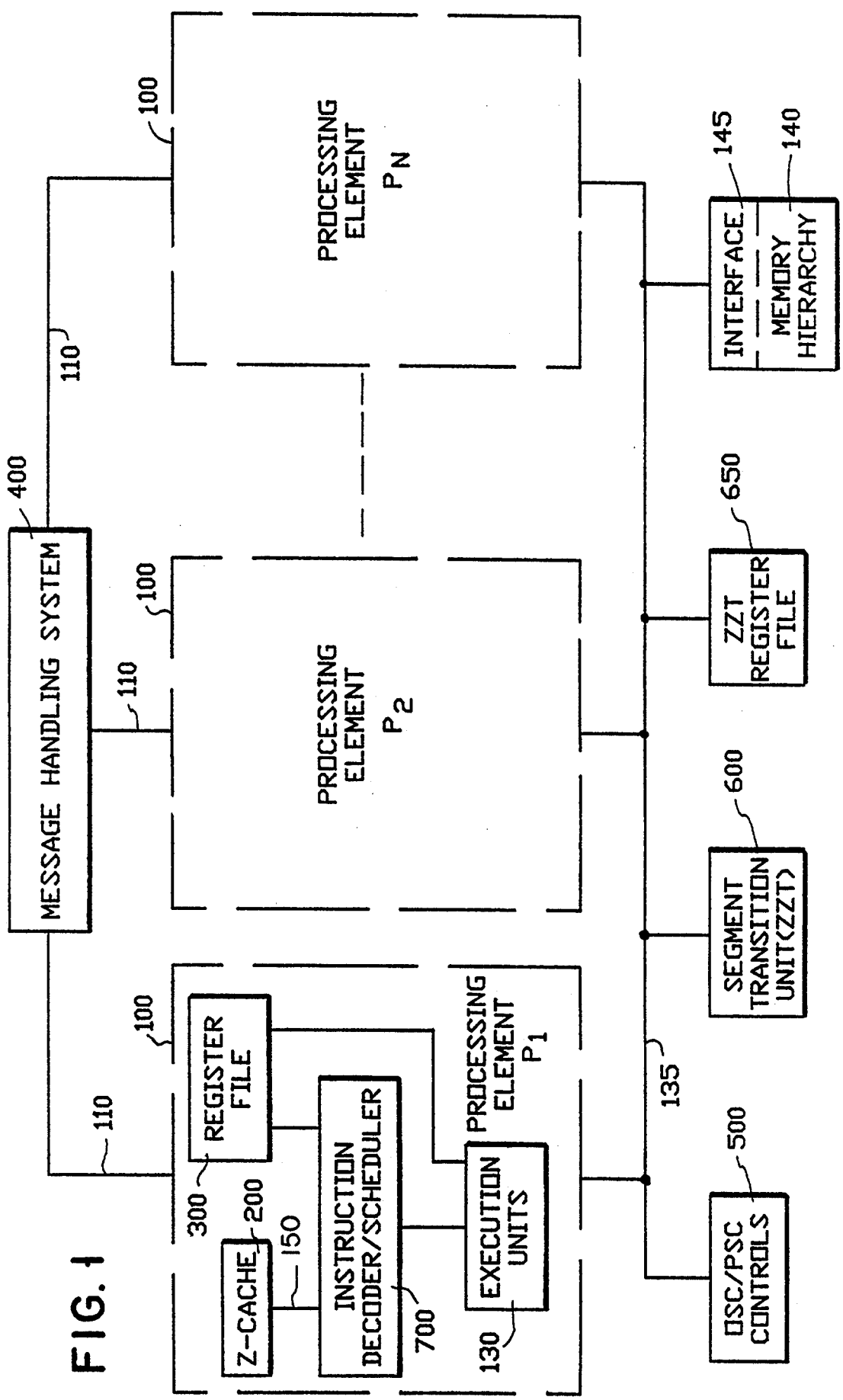
FIG. 1 is a block diagram of a preferred embodiment of a self-parallelizing processing system in accordance with this invention.

A block diagram of the MSIS processor organization is shown in FIG. 1. Each Processing Element 100 is capable of decoding instructions using an Instruction Decoder/Scheduler 700, accessing its own Register File 300 to generate addresses for memory operands and to access register operands. These operands are sent to the Execution Units 130 within the Processing Elements, which perform the operations specified by the instruction and put away the results of the executions. The Processing Elements in MSIS are identical with the exception that each Processing Element has a prespecified Identification Number (1, 2, in a system with n Processing Elements). This Name of a Processing Element is known to the Processing Element and during the E-Mode, for example, it allows the Processing Element to determine if the instruction that it is decoding is assigned to it. Each Processing Element is connected via a Bus 135 to a Memory Hierarchy 140 which supplies data operands on fetch operations, receives store operands on store operations, and is used for instruction fetching during the E-Mode. The actual fetching and storing of operands is done through a set of OSC/PSC Controls 500 which assure that all hazards associated with out-of-sequence operations are detected.

A Segment Transition Unit 600 (hereafter often called the ZZT, an acronym for Z-Code to Z-Code Transition) stores information which facilitates branch recovery. It also uses information in a ZZT RFILE 650, which stores the values of registers needed in order to make a transition into a Z-Code segment. Both the ZZT and ZZT RFILE are accessed via Bus 135.

Each Processing Element can communicate with any other Processing Element via a Message Handling System 400.

Each Processing Element has its own private Z-Cache 200 which stores annotated instructions for the Z-Mode of operation. Instruction fetching during the Z-Mode uses a dedicated Bus 150 within each Processing Element.

SECTION 2 PRIVATE Z-CACHES

Figure 2A:
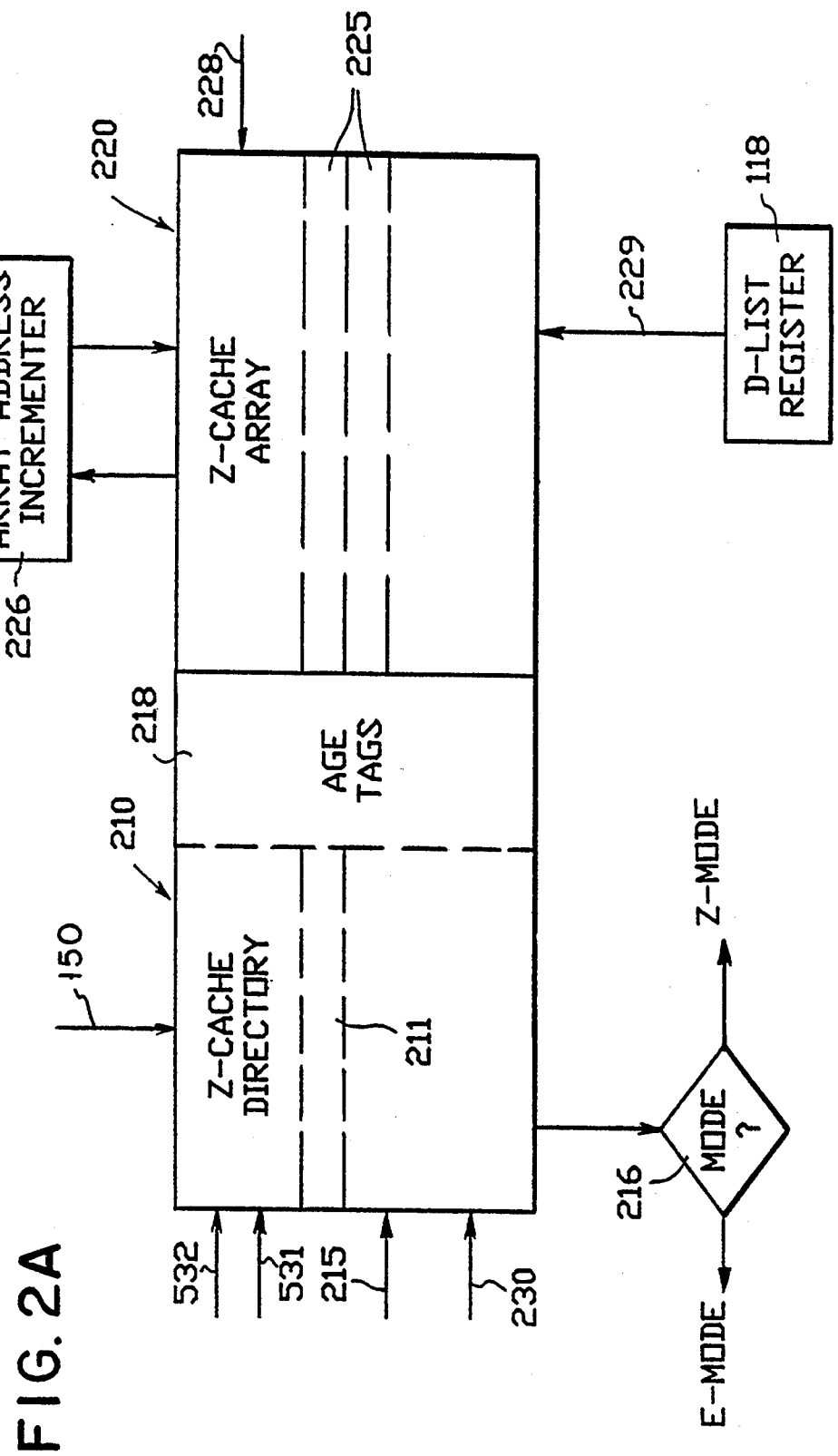
FIG. 2A illustrates the structure of the private Z-Cache used by a single processing element in the preferred embodiment.
Figure 2B:
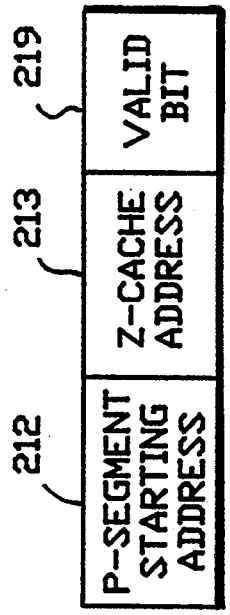
FIG. 2B illustrates the format of an Entry in the Directory of a Z-Cache.

Instruction fetching during the Z-Mode is done by accessing the Z-Code in a Z-Cache 200 (FIG. 1A) that is associated with each Processing Element. The organization of the Z-Cache is illustrated in FIG. 2A. Z-Cache Directory 210 is used to keep track of the Z-Segments stored in the Z-Cache Array 220. The contents of the Z-Cache 200 represent a prespecified number of Z-Segments, each Z-Segment having a maximum number of Cells 225, each Cell accommodating one Z-Instruction. Each Z-Cache 200 comprises a Directory 210 and an Array 220 of Cells addressed from that Directory. The format of a Z-Cache Directory Entry 211 is shown in FIG. 2B. It contains the Starting Address 212 of the P-Segment from which this Z-Segment was created, the Z Cache Address 213 of the Cell which contains the first Z-Instruction in that Z-Segment for that Processing Element, and a Valid Bit 219.

The Directory invalidation feature using the Valid Bit 219 is used in two situations. Signal Line 531 is used to invalidate all Z-Code in all Processing Elements when a Program Store Compare (PSC) hazard is detected. Signal Line 532 is used to invalidate the current Z-Segment when an Operand Store Compare (OSC) hazard is detected. Both these hazards are described in detail in Section 5.

The Directory 210 can also receive an address from the ZZT-Scanner 660 (FIG. 6D) via a Bus 215, which is used as a search argument against the Directory. If a match occurs, the Processing Element will set the mode of the Processing Element to Z-Mode via Decision Element 216.

Instruction fetching (i.e., I-Fetching) during Z-Mode is derived from the Z-Cache. The absence of a match with any Directory Entry Address 212 causes the setting of The Processor Element to the E-Mode via Decision Block 216 and the I-fetching in E-Mode is derived from the Memory Hierarchy 140 (FIG. 1).

Figure 2C:
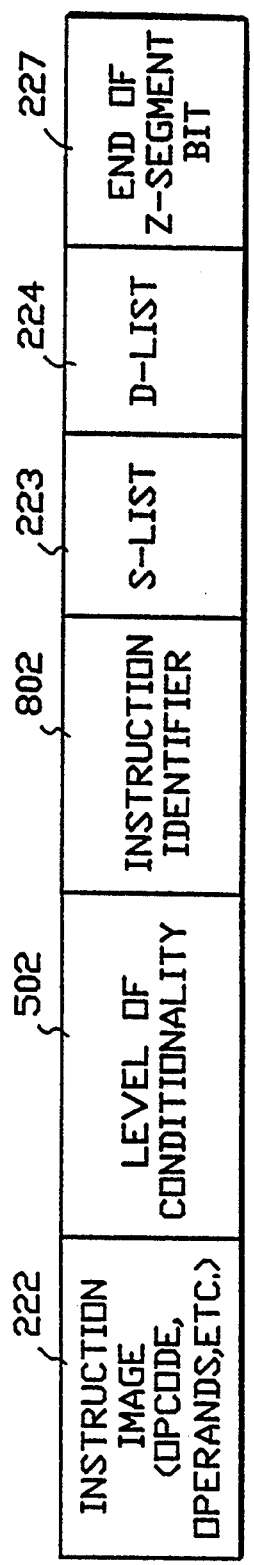
FIG. 2C illustrates the format of a Z-Instruction stored in a Cell of a Z-Cache.

The Z-Cache Array 220 contains the Z-Instructions. Z-Instructions are of fixed size and format, which is illustrated in FIG. 2C. Each Z-Instruction contains the following information:

Instruction Image 222 (Opcode, Operands, Etc.), which is the usual information necessary to execute the instruction;

Level Of Conditionality 502, which is used by the Operand Store Compare (OSC) controls within the cache to manage the detection of the OSC hazard and determine when Stores may be released to the Memory Hierarchy;

Instruction Identifier 802, which is the sequence number of the instruction within the P-Segment and is used as part of any message sent by the instruction;

S-List 223, which gives the dependency of this instruction on others for input;

D-List 224, which lists the Z-Instructions/Processing Elements that need the results of execution of this Z-Instruction;

End of Z-Segment Bit 227, which is a bit specifying that this is the last instruction for this Processing Element in this Z-Segment.

Successive Z-Instructions for each Processing Element occupy consecutive Cells 225 of the Z-Cache Array 220 associated with that Processing Element and an Array-Address Incrementer 226 is used to access that Cell.

As part of the I-Fetch operation, all the information in the Z-Cache Cell is transferred to the Decoder and other relevant portions of the Processing Element in a manner that will be detailed later.

The creation of Z-Segments in the E-Mode is sensitive to the limitations of the Z-Cache size and structure, which are arbitrary in principle, but are limited in any implementation. Z-Segments exceeding the capacity of the Z-Cache cannot be created as the E-Mode is terminated and trimmed to the last full Level of Conditionality.

Figure 2D:
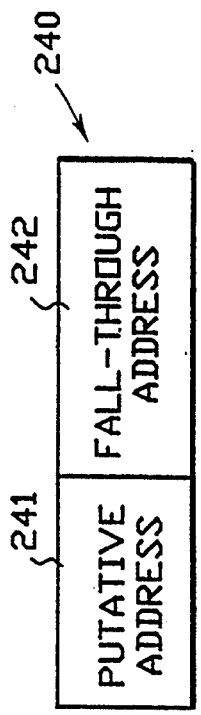
FIG. 2D illustrates an Instruction Format Extension for a Z-Cache Cell.

There being no relationship between Memory Hierarchy addresses of instructions and their position in the Z-Cache, some of the Z-Instructions must also have an Instruction Format Extension 240 (FIG. 2D) associated with them, which contains Memory Hierarchy addresses when this information will be required. In the case of branch instructions this extension is required. Each conditional branch instruction has the address of the Putative Address 241 that was used to generate the Z-Code, and a Fall-Through Address 242 which is the value of the Program Counter (PC) and points to the next-sequential instruction that follows the branch.

If the branch target is:
the same as the Putative Address 241, no action need be taken,
is not the Putative Address 241 because the branch is not taken, then a Branch Wrong Guess (BWG) action is taken with respect to the Fall-Through Address 242,
if the branch is taken to a target other than the Putative Address 241, that address is generated by the Processing Element at the point of address generation of the branch instruction and the BWG action can be taken with respect to that target.

For unconditional branches, only the Putative Address 241 is used and the value of the Program Counter (PC) can occupy the Fall-Through Address 242. The value of the PC can be used to set the value of registers, when PC-dependent values are needed for such instructions as BAL(R) (Branch and Link (Register)).

The contents of all Z-Cache Directories are the same although the contents of the Z-Instruction Cells in the Z-Cache Array is different in different Processing Elements. The maintenance of multiple identical Z-Cache Directories represents a trade-off between creating greater autonomy within the Processing Elements and sending messages to the Processing Elements when a new Z-Segment is to be initiated.

At the start of the E-Mode, a common Directory Entry is made in all Z-Caches using information supplied by the Processing Element via a write Bus 230. If all Entries in the Directory 210 are valid, then a Least Recently Referenced (LRU) algorithm is used to select the Z-Segment to be replaced (e.g., employing the standard age-tag dating of directory entries using Age Tags 218).

The Cells 225 for the Z-Segment in each Processing Element are updated using the Bus 228. This Bus works in conjunction with the Array-Address Incrementer 226, so that instructions assigned to a Processing Element are stored as Z-Instructions in consecutive Cells, although they may not be consecutive in the original instruction stream.

During the E-Mode, the information for the Z-Instruction format is available at the decode time of the instruction with the exception of the D-List. The Cells are updated with D-list information via Bus 229, as a broadside load of the Cells, using a parallel write operation from a D-List Register 118 maintained by the Processing Element. A partial broad-side write is performed into the D-List 224 field within each Cell occupied for that Z-Segment. This operation is done at the end of Z-Code generation.

SECTION 3 SEPARATE REGISTER FILES

The Register file structure of MSIS is shown in FIG. 3. Each Processing Element (PE) has its own dedicated Register file 300. For a system of n Processing Elements and with k conventional registers, Register File 300 is an k×n matrix. Each PE has its private copy of R. for Processing Element p, the usage of Register File 300 is as follows:

The element R [r,p] is just like its conventional register r. That is, for PE p, the cell called R [r,p] acts as the source for all instructions executed by PE p which need register r, and acts as the sink for all instructions on PE p that modify register r.

The element R [r,q] (where q is not equal to p) holds a message (if any) from processor q about what q stored into register r.

Each row R [r,*] is associated with a Valid Bit 310 which indicates whether the register contents of r are to be found in that row or whether they must be initialized from another source.

Each element R [r,j], when itself valid, contains the register contents and the ID of the instruction that stored those contents.

There are two notions of valid within the Register File 300 and they are associated with bits maintained in different places. If the PE is initialized following a transition and it is necessary for the initial value to be derived from the ZZT RFILE 650 (FIG. 6), then the Valid Bit 310 is used which indicates that all items on the row R [r,*] are invalid. Another valid status is associated with each R [r,j] and is part of the contents of the cell R [r,j]. This is called the Cell Valid Bit 320 and refers to the validity of the contents of the cell R [r,j].

The purpose of reserving for each register a position in the Register File 300 for each other Processing Element is not only to simplify the deadlock avoidance mechanism but such a structure is the minimum size structure that allows the PE to manage register contents during the E-Mode in a completely general and totally asynchronous fashion. If register lists were used instead, deadlock might occur in an asynchronous system when a Processing Element fills up the register list for a given register by sending messages that will be required in the distant future and preventing urgently needed messages from being posted on the list.

The formats of the contents of the Register File 300 and the operations of the PEs with respect to Register File 300 are described in more detail in Section 8. The basic operations that the PE performs with Register File 300 are: VALIDATE, RECORD, SEND, and RECEIVE, which are fully detailed in Section 8.

The Message Handling System (MHS) 400 receives a message and enters it in the list for the cell within the Register File 300 that is designated by the message. Within the MHS, these messages are stored in the list position that is associated with the sending PE. Within the receiving PE, there is never any more than one outstanding future pending register value in the Register File from any other PE. The method of inserting the message into the proper cell of the Register File is by use of a write Bus 350 from MHS 400. The operations specified as VALIDATE, RECORD, SEND, and RECEIVE, that are detailed in Section 8, derive the appropriate value of register r from the row R [r,*] and for PE p will move this value into the cell R [r,p], when this is indicated by the S-List of the Z-Instruction.

For PE p, the use of R [r,q] where q≠p causes all echo message to be sent to the MHS via a Bus 360. The action of the MHS upon receipt of the echo message will be described in Section 4. In summary however, this echo message allows the MHS to send the oldest pending message that it has for the just released cell within the Register File. As all Processing Elements execute instructions in conceptual sequence with respect to the instructions that have been assigned to them, that is, the sequence of instructions assigned to a given Processing Element is a subsequence of the original single instruction stream, the oldest pending message for the cell that was just freed up is the next message, associated with that cell that the receiving Processing Element will require. During the interval between echo and receipt of the new message, the cell will be marked invalid via the Cell Valid Bit 320.

Another feature of the messages stored in the Register File, from other Processing Elements, is that they will all be used unless a Branch Wrong Guess occurs. The message handling primitives (i.e., VALIDATE, RECORD, SEND, and RECEIVE) guarantee that no unnecessary messages are sent and thus the deadlock-free operation of MSIS is guaranteed.

SECTION 4
MESSAGE PASSING BETWEEN PROCESSING ELEMENTS

Figure 4A:
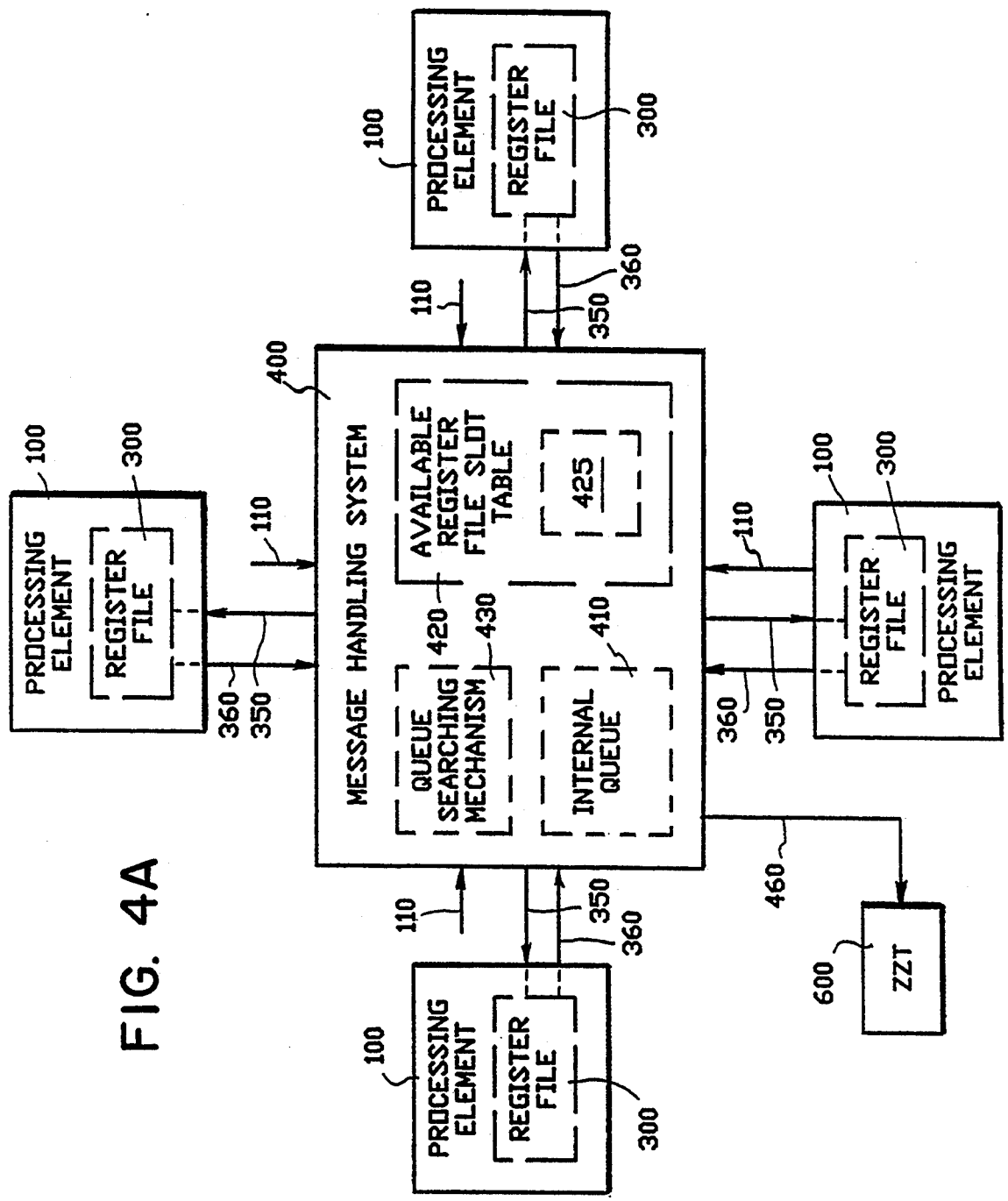
FIG. 4A is a block diagram of the Message Handling System which communicates register values to processing elements in the preferred embodiment.

The structural elements of the Message Handling System (MHS) 400 are illustrated in FIG. 4. The bus operations of the MHS have been designated as:

Bus 110, which is used to send messages from each Processing Element to the MHS (FIG. 1);

Bus 350, which is used to send messages from the MHS to the Register File of the receiving Processing Element (FIG. 3);

Bus 360 which is used to send an echo of the message back to the MHS to allow a pending message for that freed up RLE to be forwarded to the receiver.

The formats of the messages will be discussed in Section 8 along with the register handling primitives: VALIDATE, RECORD, SEND, and RECEIVE.

The MHS must have an Internal Queue 410 to allow it to pend messages that can not be immediately sent to the receiver. The Queue size is related to the Z-Segment size so that the Queue size is larger than the total number of messages sent within the Z-Mode. The E-Mode monitors the total number of messages which must be sent and will terminate a Z-Segment when the message total might exceed the Queue size.

Figure 4B:
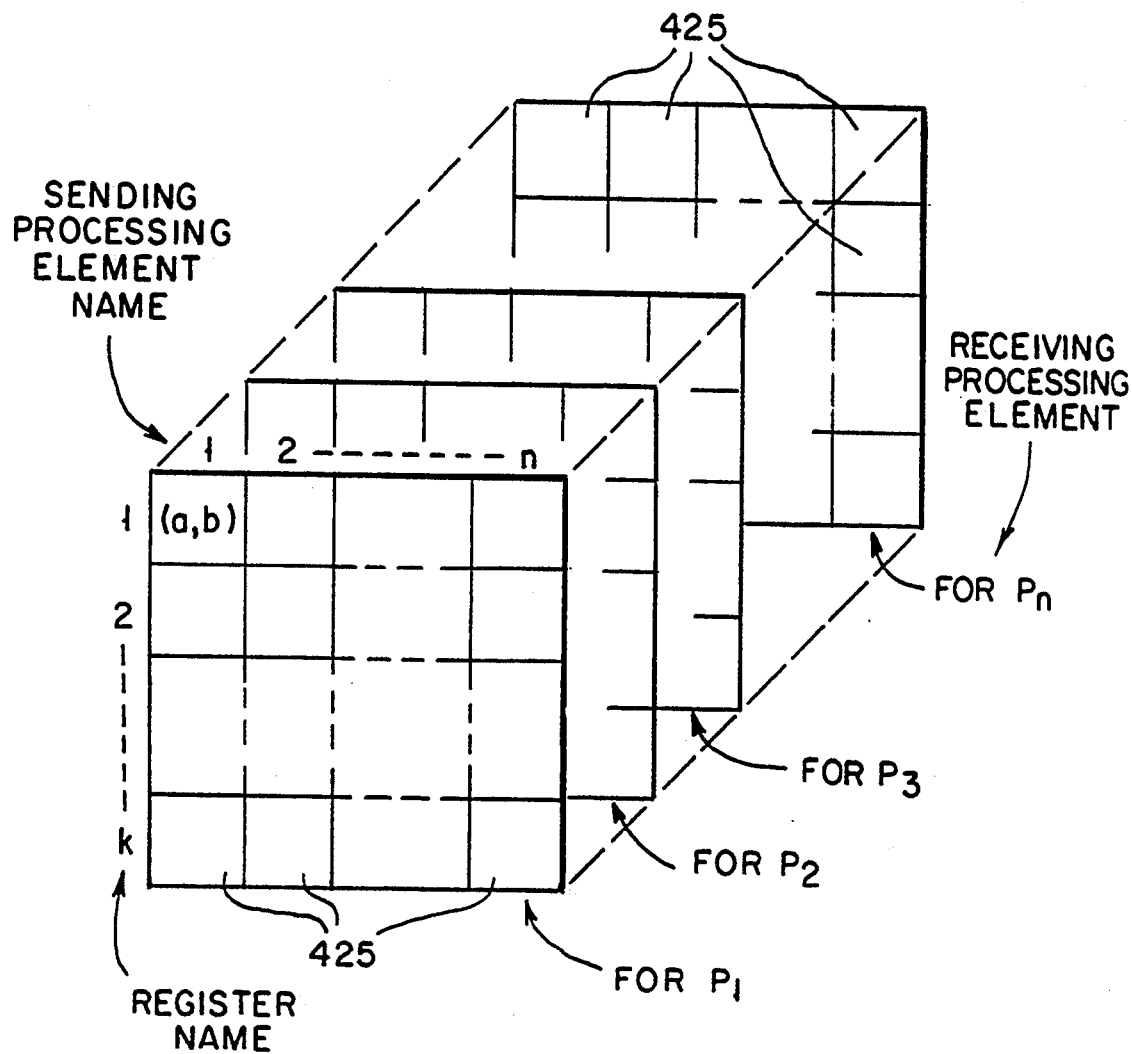
FIG. 4B illustrates the Internal Queue of the Message Handling System.

The MHS also has an Available Register File Slot Table (ARFST) 420, illustrated in detail in FIG. 4B, which records an array of Two Bit Entries 425 designated (a,b) for each receiving Processing Element. The elements of the ARFST for a given receiving Processor Element correspond to a matrix with rows designating Register File names and columns identifying the sending Processing Element name. The values possible for (a,b) are:

(0,0)—indicating that a slot is available and no message is pending for that slot;

(1,0)—indicating that the slot is occupied and no message is pending for that slot;

(1,1)—indicating that the slot is occupied and at least one message is pending for that slot.

At the outset, following the completion of a Z-Segment, or a Branch Wrong Guess, the Internal Queue 410 is cleared and the ARFST 420 is reset so all entries are (0,0) for all receiving Processing Elements. As each message is processed, the entries are modified. On the receipt of the echo message the entries are modified. If a message is queued, because a equals 1, the entry is modified as appropriate. The purpose of the queuing bit b is to avoid unnecessary queue searches by Queue Searching Mechanism (QSM) 430 if no message is queued for a just released slot. The QSM 430 must continue the search to determine if more than one message is pended for the slot. If there is only one message the b must be set to zero, otherwise it remains one. The sending of a queued message following an echo always sets a to 1.

Messages are also sent from the Processing Elements to the ZZT 600, a Branch Wrong Guess recovery unit. Such messages use the Bus 110 to get to the MHS and Bus 460 to get to the ZZT. The message contains the Level of Conditionality (LC) 502 (FIG. 2) of the sending instruction and the Register name, which allows the value of the Register to be stored in the ZZT in the proper location. This accommodates maintenance within the ZZT of the last change to a Register value at each LC since the D-List of the instruction which last changes the value of a Register at each LC includes the ZZT. In the Z-Mode when the D-Lists are already available, the sending of the Register value to the ZZT Frame 640 (FIG. 6) is performed as described (i.e. via Bus 110) from the PE to the MHS and via Bus 460 from the MHS to the ZZT Frame.

In the E-Mode, where the D-List is formed based on the determination that a future instruction will require the result of another PE execution and where the input to the ZZT Frame are determined when each PE decodes a branch and determines that it was the last PE which modified the Register in conceptual sequence, the sending of the message is via Bus 135 to the Memory Hierarchy with those bits which distinguish the message as a STORE to the ZZT Frame.

Figure 6E:
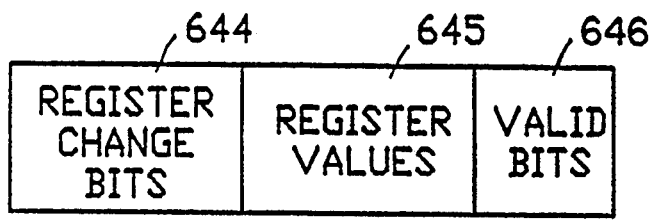
FIG. 6E illustrates the format of a ZZT Cell in the ZZT Frame.
Figure 6F:
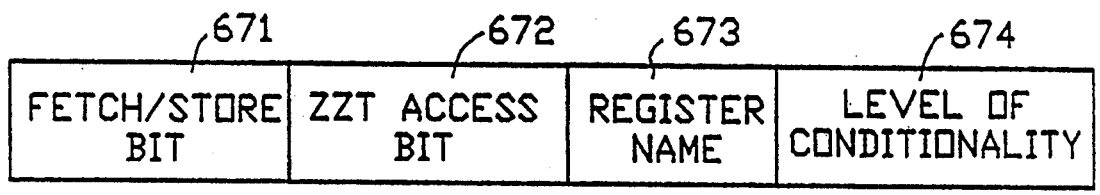
FIG. 6F illustrates the format of a message sent to a ZZT Cell.

In the E-Mode, if an instruction is the conceptually last instruction to modify a Register at a given LC, a message is sent via Bus 135 to the cell in the ZZT Frame for the current LC. Such a message carries the following information:

A Fetch/Store Bit 671 (FIG. 6F) indicating FETCH or STORE, and a ZZT Access Bit 672 (FIG. 6F). These two bits in combination allow the Memory Hierarchy 140 interface to distinguish FETCH from the ZZT RFILE from a STORE in the ZZT Frame or from other FETCHES and STORES to the Memory Hierarchy 140 interface;

Register Name 673 (FIG. 6F); and

Level of Conditionality (LC) 674 (FIG. 6F).

As a result, for a STORE ZZT Access, the ZZT Frame Entry is modified as follows: For the modified Register, the Register Change Bits 644 (FIG. 6E) in the ZZT Cell 641 for the LC 674 and the Register Name 673 is turned on and the new Register contents are written into the corresponding Register Values field 645 (FIG. 6E).

This entire arrangement within the MHS is to always allow a Processing Element to receive a pending message, to operate asynchronously with respect to the sender and the receiver, and to avoid deadlock. As each Processing Element awaits the required messages before it processes the instruction assigned to it or any conceptually later instructions, deadlock ensues if the message that is awaited cannot be sent. The disclosed design prevents a deadlock condition from occurring since the needed message can never be blocked.

SECTION 5 MONITORING FOR OSC AND PSC

The structural elements of the Operand Store Compare (OSC) Controls and the Program Store Compare (PSC) Controls 500 are illustrated in FIG. 5. As each FETCH and STORE is presented to the Memory Hierarchy Interface 145, Controls 500 monitor OSC and PSC and interact with the access. Thus, the placement of Controls 500 can be part of the Memory Hierarchy Interface 145 and can be considered as an adjunct to it. Each of these Controls 500 is now described separately.

Operand Store Compare (OSC)

The architecture of a processor usually requires that a FETCH from a memory location must see the value stored in that location by the latest STORE preceding that FETCH in the conceptual sequence. This is called OSC and a violation of this is known as an OSC hazard. In MSIS, since the FETCH and the STORE may be performed asynchronously on different Processing Elements, they need to be monitored to determine whether or not a possible OSC hazard has occurred.

For the remainder of this Section 5, the term FETCH will denote an operand fetch and instruction fetching will be specifically indicated as such whenever the intent is to consider it.

An OSC hazard is said to be intra-Processing Element, if the corresponding FETCH and STORE operations are executed on the same Processing Element. As instructions are maintained in conceptual sequence within a Processing Element, the monitoring of the intra-Processing Element OSC is standard. Hence, we will not discuss this further and concentrate on inter-Processing-Element hazards.

An OSC hazard is said to be inter-Processing-Element, if the corresponding FETCH and STORE operations are executed on different Processing Elements. The monitoring of such a hazard is done using the following two attributes of an instruction:

1. Level of Conditionality (LC) 502 (FIG. 5C), which is the number of branch instructions that executed prior to the execution of this instruction in the P-Segment. The LC of the first instruction in a P-Segment is zero. The LC of an instruction that is not preceded by a branch in the P-Segment is the same as that of its predecessor. The LC of an instruction that is preceded by a branch in the P-Segment is one more than that of its predecessor. Thus, all instructions within a branch group, including the branch which terminates the branch group, have the same LC; and
2. Instruction Identifier (ID) 802 (FIG. 5C), which is the sequence number of the instruction in the P-Segment.

In E-Mode, all Processing Elements see all instructions in sequence, so both LC and ID are known in a natural way. As Z-Code is generated, LC and ID are associated with each Z-Instruction and hence this information is available in Z-Mode as well.

The OSC Controls maintain two tables: a Fetch Table, 510 (FIG. 5A) with a Comparator 514 and a Store Table 520 with a Comparator 526.

Figure 5A:
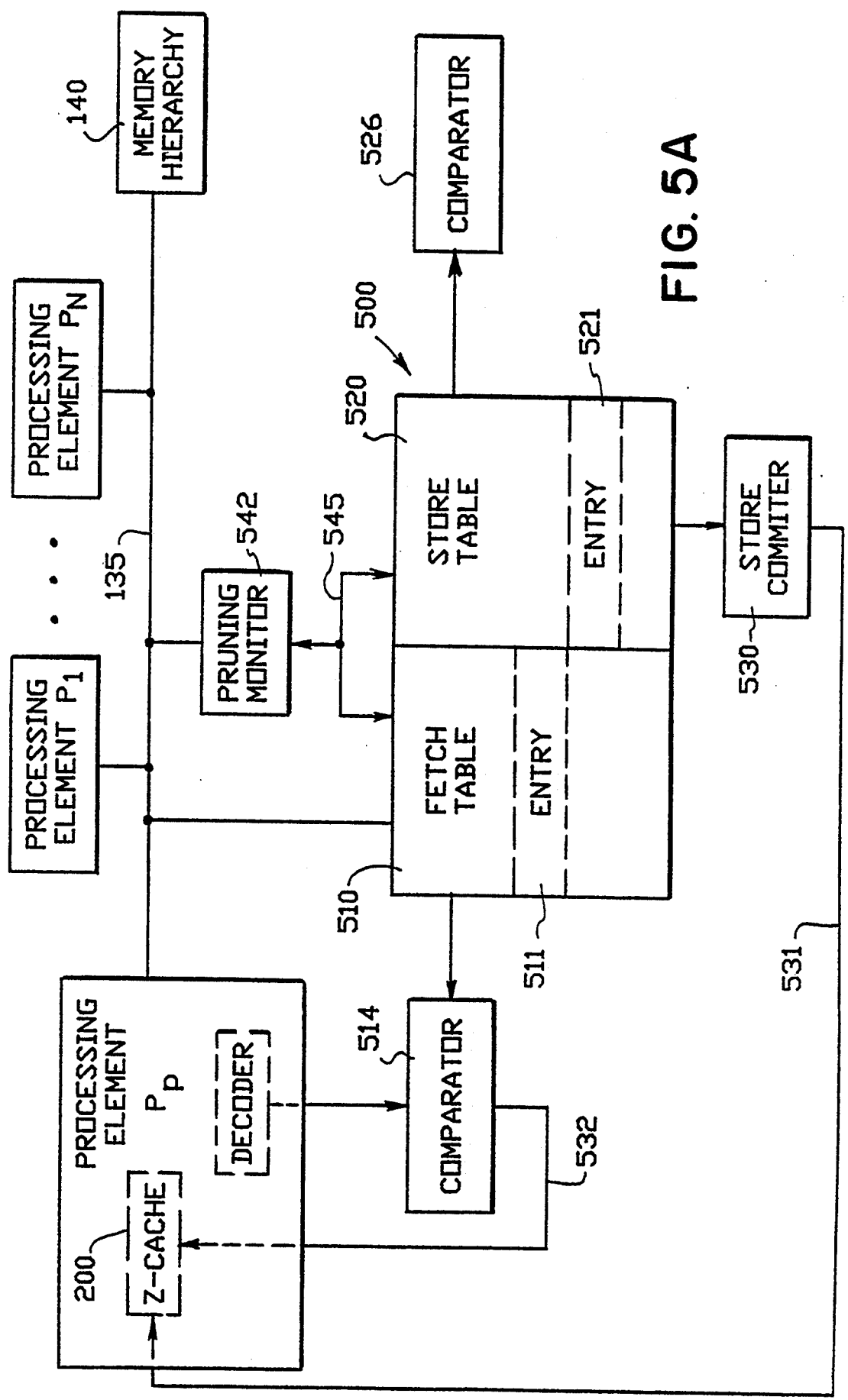
FIG. 5B illustrates the format of a Fetch Table Entry in the OSC/PSC Controls.
FIG. 5C illustrates the format of a Store Table Entry in the OSC/PSC Controls.
FIG. 5D illustrates the Pruning Monitor in the OSC/PSC Controls.
Figure 5B:
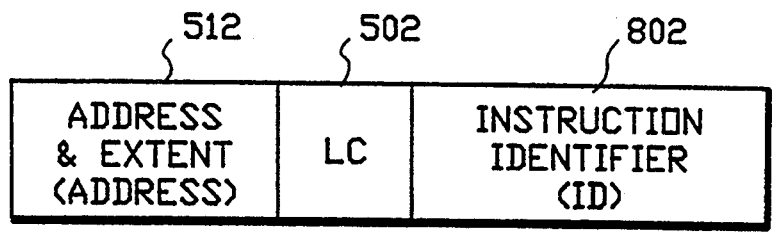

A Fetch Table Entry 511 is illustrated in FIG. 5B and has the form (Address, LC, ID). Address 512 is the full address of the FETCH and its extent in bytes. The LC 502 and the ID 802 of the FETCH instruction that generated the FETCH are also included in the Fetch Table Entry 511. FETCHES that span multiple Double Words (DW) create multiple entries in the Fetch Table.

Figure 5C:
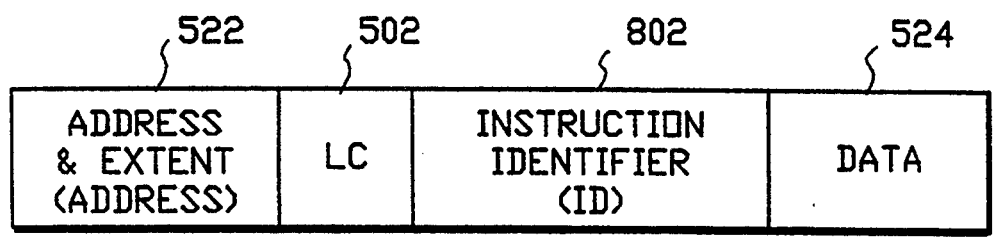

A Store Table Entry 521 is illustrated in FIG. 5C and has the form (Address, LC, ID, Data). Address 522 is the full address of the STORE and its extent in bytes. The LC 502 and the ID 802 are derived from the STORE instruction. Data 524 is the full DW to be stored into the Memory Hierarchy, as part of the STORE instruction. The Data 524 is derived by merging the result of the STORE with the other bytes within the DW as taken from the Memory Hierarchy. Should a STORE cross a DW boundary, two entries in the Store Table are made, one for each DW affected. Store instructions which generate multiple DWs will be treated similarly.

A FETCH is executed as follows:
1. By matching on the Address field, Entries are selected from the Store Table that have the same Address as the FETCH instruction and have a smaller ID than that of the FETCH instruction.
2. If a match occurs, the FETCH returns the Data 524, to the requesting Processing Element, from the matched Store Table Entry having the largest ID that is less than the ID of the FETCH.
3. If there is no match on any STORE entry with a lower ID, then the value for the FETCH is obtained from the Memory Hierarchy 140.
4. An Entry is made into the Fetch Table for this FETCH instruction. The Processing Element FETCH/STORE LC Table 544 is updated, if it changes.

A STORE is executed as follows:
1. By matching on the Address field, Entries are selected from the Fetch Table that have the same Address as the STORE instruction and have a larger ID than that of the STORE instruction.
2. If any such entry exists, an OSC hazard is raised.
3. An entry is made into the Store Table for this STORE instruction. The Processing Element FETCH/STORE LC Table 544 is updated, if it changes.

Figure 5D:
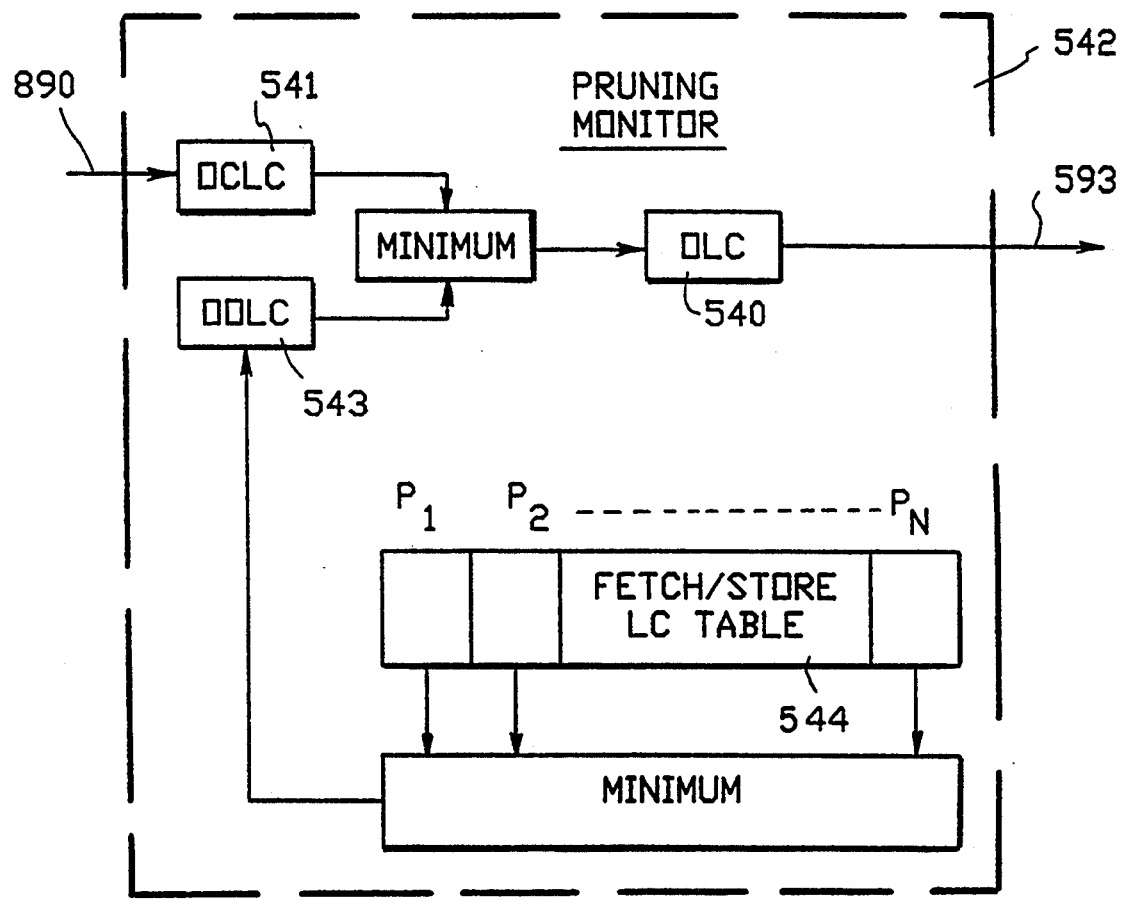

The entries in the above two tables are pruned using a Pruning Monitor 542, illustrated in detail in FIG. 5D, which maintains 3 quantities:
1. Overall Certified Level of Conditionality (OCLC) 541: The branch resolution mechanism communicates to the Pruning Monitor via Bus 890 the resolution of each branch instruction in the Z-Code. At any given time, the OCLC is the largest LC, such that all branches at lower levels have been resolved correctly. When a branch at the LC which is one more than the OCLC is resolved as a BWG, the stores at the LC of the branch are pruned and the OSC controls are cleared.
2. Overall Operand Level of Conditionality (OOLC) 543: Whenever a memory FETCH or STORE instruction is executed, its LC is used to update the FETCH/STORE LC Table 544 entry for that Processor Element and a value that is one less than the minimum of these entries across all Processing Elements is the OOLC 542. Whenever a Processor Element executes the final instruction of its Z-Code as indicated by the End of Z-Segment Bit 227 (FIG. 2C), the Processing Element will send an End of Z-Code signal as a pseudo-FETCH. The sole purpose of this signal is to set the value of the entry in the FETCH/STORE LC Table for this Processing Element to a value that is sufficiently high so that it does not figure in the minimization.
3. Overall Level of Conditionality (OLC) 540: OLC is the minimum of OOLC and OCLC.

The implication is that each Processing Element has executed all instructions at levels lower than OLC, as instructions within a processor are always in conceptual order. Furthermore, all branches at levels lower than OLC have also been resolved. Hence, any FETCH/STORE entries at levels lower than OLC can be pruned. Whenever OLC changes, the Pruning Monitor takes the following actions via Bus 545:

1. Remove all Entries From the Fetch Table with LC lower than OLC.
2. Select all Entries from the Store Table with LC lower than OLC.
3. If none of the selected Entries raises a PSC (as described later), then scan the above selected Entries in increasing order of their ID and as each Entry is scanned, commit the STORE and delete the Entry from the Store Table.

The OLC 540 (FIG. 5D), using Bus 593, has the task of informing the ZZT Scanner 660 (FIG. 5D) and the OSC/PSC Controls as to the final LC of the Z-Segment, LCF, and the new Segment starting address of the next Segment following a BWG.

Figure 7:
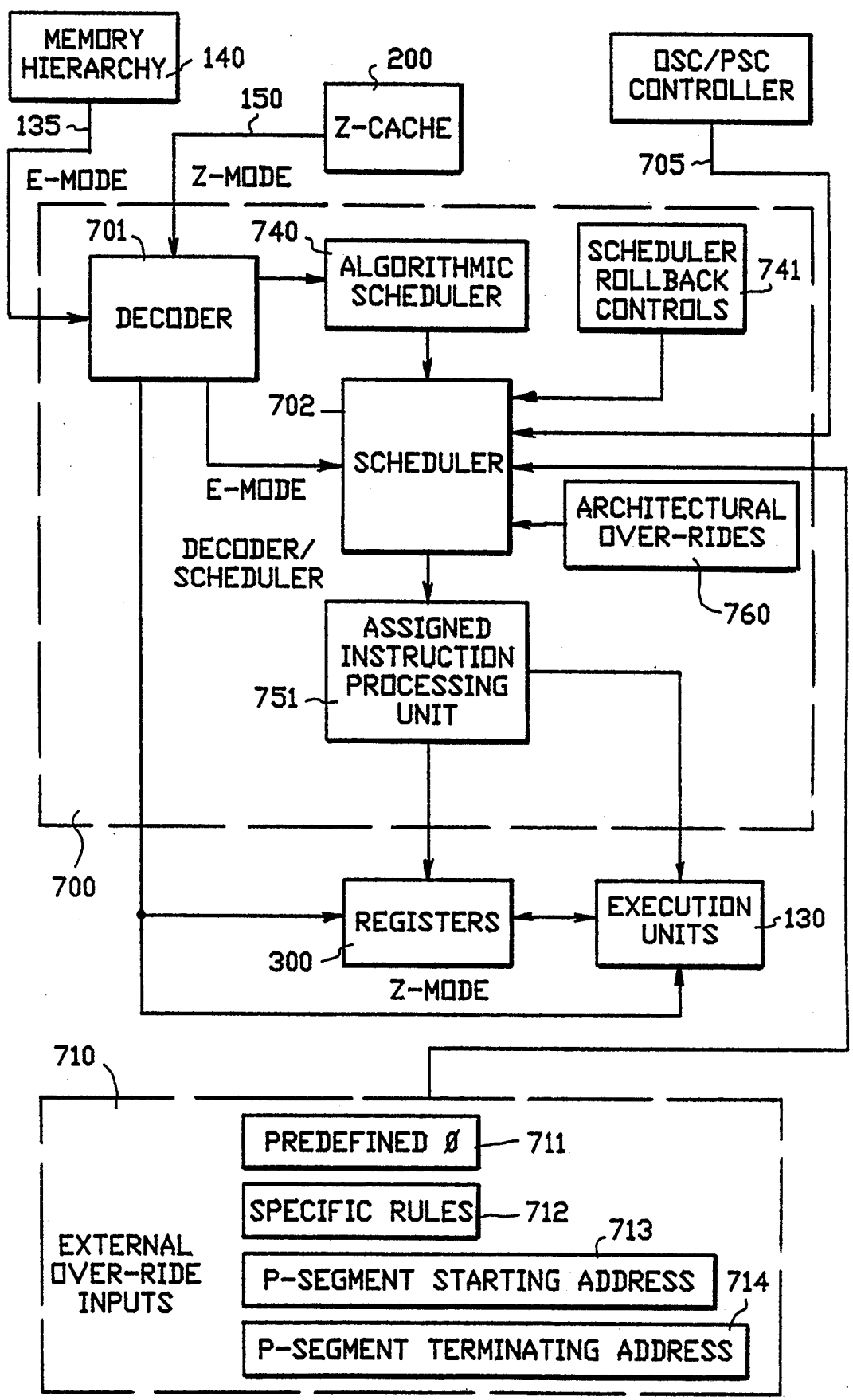
FIG. 7 is a block diagram of a Decoder/Scheduler in a processing element in the preferred embodiment.

When an OSC hazard is raised, the Decoder 700 is presented with the Instruction Identifiers of the instructions which created the hazard via a Bus 705 (FIG. 7). The hazard is cleared by simulating a Branch Wrong Guess at the preceding LC. A hazard raised at conditionality level zero restores the machine state that corresponds to the start of the Program Segment (P-Segment). A hazard raised at some non-zero LC, restores the machine state that corresponds to the branch instruction at the preceding LC. In either case, the current Z-Code is invalidated in all Z-Caches using Bus 532 and E-Mode is entered.

To avoid the hazard within a Level of Conditionality, a FETCH and a STORE whose instruction formats suggest that they will access the same memory location (for example if their operands use the same base and index registers and have the same displacements), should be scheduled on the same Processing Element.

Program Store Compare (PSC)

Certain architectures support self-modifying programs by allowing "stores into the instruction stream." For such architectures MSIS is required to determine if the Z-Code generated is valid for subsequent re-execution by monitoring for the possibility that storing may have occurred into the I-Stream for the code used to generate this Z-Segment or an active Z-Segment may itself STORE into its own I-Stream. The name given this hazard is PSC.

The Memory Hierarchy has a Cache and an associated Directory that contains an Instruction Reference Bit that specifics that the line was used as a source of instruction fetching in the E-Mode. If such a line leaves the cache then PSC is raised and all Z-Code is invalidated using Bus 531 (illustrated also in FIG. 2A).

If the Store Commiter 530 which commits STORES to the Memory Hierarchy based on the pruning of the Store Table 520 determines that a STORE will be made into a line with the Instruction Reference Bit set on, it raises the PSC hazard and cancels the commitment of all Stores at the LC where the PSC hazard was raised. The machine state at the prior LC is restored and the PSC hazard is cleared in the same manner as an OSC hazard.

SECTION 6 HANDLING BRANCHES

In pipelined architectures, several instructions could be partially executed before a branch decision is determined. Often this is done by guessing the branch decision using some criteria. When a branch is guessed wrong, the corrupted state of the processor must be restored to the state the machine was in right after the branch. Processor architectures differ in what constitutes their machine state. Generally the state comprises the contents of addressable registers.

MSIS complicates the state restoration process in two ways. First, a BWG in E-Mode results in discarding the Z-Code built since the wrongly guessed branch instruction and re-adjustment of instruction IDs for the correct sequence of instructions following the branch. Second, the register state in Z-Mode is distributed in both space and time. As a result, state restoration is more complex, requiring some broadcast of information to all Processing Elements and resynchronization of their activities.

Furthermore, MSIS involves transitions between E-Mode and Z-Mode even without BWG. The actions taken during such transitions are identical to those during a BWG. We employ a common mechanism, known as ZZT, to deal with all branching and transition aspects uniformly. This is the subject matter of this Section and is illustrated in FIG. 6.

There are four basic data structures that are involved in the implementation of ZZT, namely a ZZT Cache Directory 620, a ZZT Cache Array 630, A ZZT Frame 640 and a ZZT RFILE 650.

ZZT Cache Directory

The ZZT Cache Directory 620 is used to remember the P-Segments for which Z-Code is available. Each ZZT Cache Directory Entry 621 is of the form (P-Segment Address 622, ZZT Cache Address 623) as illustrated in FIG. 6B. The P-Segment Address 622 is the address of the first instruction in the P-Segment and the ZZT Cache Address 623 is a pointer into the ZZT Cache Array 630.

The ZZT Cache Directory 620 is searched associatively to match a given address supplied by the Bus 215 with the Z-Entry Address 622 of an Entry 621. When a match occurs, it gives out the corresponding ZZT Cache Address 623. A match causes the mode to be set to Z-Mode at Decision Element 626. In E-Mode, a match causes a transition from E-Mode to Z-Mode. In Z-Mode, a match causes a transition from one Z-Segment into another Z-Segment. A non-match implies that no Z-Code is available for the search argument. In E-Mode, a non-match results in continued E-Mode execution. In Z-Mode, a cache-miss causes a transition from Z-Mode into E-Mode.

New entries are made into the ZZT Cache when an E-Mode execution completes the assembly of a new Z-Segment. Entries in the ZZT Cache are managed in the usual manner with an LRU replacement strategy using Age Tags 628.

ZZT Cache Array

The ZZT Cache Array 630 contains the repository of information for Z-Segments that have been composed. Each Z-Segment occupies a portion of the ZZT Cache Array and uses one Array Element 631 for each Level of Conditionality. Thus, a Z-Segment having K Levels of Conditionality in it, will occupy K consecutive elements in the ZZT Cache Array. The pointer to the first Array Element of a Z-Segment is the ZZT Cache Address 623. Each ZZT Array Element 631 has the form (Register Modification Bit Vector 632, End of Segment Bit 633) as illustrated in FIG. 6C. The End of Segment Bit 633 is 1 for the last Array Element of the Z-Segment and is 0 for the rest. The Register Modification Bit Vector 632 contains one bit for each addressable register. Bits within the Bit Vector 632 indicate whether Z-Instructions From this Z-segment and for this Level of Conditionality LC modify each register or not.

When a new Z-Cache Directory Entry 211 is made in the Z-Cache 200 (FIG. 2), a corresponding set of Entries are made in the ZZT Cache 600. A ZZT Cache Directory Entry 621 is made in the ZZT Cache Directory 620 and several ZZT Array Elements 631 are made in the ZZT Array 630. At a transition to Z-Mode, the information in the associated ZZT Array Elements 631 is copied From the ZZT Cache Array 630 into the ZZT Frame 640.

The ZZT Cache Array is equipped with a read Bus 635 and a write B us 636 and an Address Incrementor 634 for accessing the elements corresponding to the called Z-Segment until the End of Segment Bit 633 is encountered.

ZZT Frame

The ZZT Frame 640 is used to dynamically monitor the modifications made to registers between branches, i.e. at each LC. It acts as a central repository for the distributed state or registers in the machine should that information be needed to recover the machine state. For each LC, it asynchronously receives from the appropriate PEs and stores the most recent value for each register. This information comes from the MHS via Bus 460 since each Z-Instruction which is the conceptually latest instruction within an LC that modifies any register will include the ZZT Frame 640 in its D-List. In the event of a BWG or a mode transition, the ZZT Frame 640 in conjunction with the ZZT RFILE 650 supplies the correct initial state of registers for the next Segment.

A single ZZT Frame causes a synchronous transition so that all PEs have finished all Z-Instructions that have an LC less than or equal to the LC that terminates the prior Segment (herein named the Caller Segment) before any PE starts the first instruction of the next Segment (herein named the Called Segment). For asynchronism between PE operations in regard to Caller Segments and Called Segments, a second ZZT Frame can be provided so that operations performed by PEs that relate to initialization, Caller Segment instructions and Called Segment instructions can be done correctly. The limitation associated with two ZZT Frames is that asynchronism is achievable across a maximum of one transition.

The ZZT Frame 640 is organized as an array, having one ZZT Cell 641 for each LC. The ZZT Cell is accessed by specifying the LC and a register name. The ZZT Cell associated with a LC has the form: (Register Change Bits 644, Valid Bits 646, Register Values 645). The Register Change Bits 644 field holds the Bit Vector 632 and is derived from the ZZT Cache Array Element 631. It indicates which registers will be modified at this LC. The Valid Bits 646 field is a bit vector indicating which registers have been modified already within the current execution of the Z-Segment and have placed their values in the Register Values 645 field. A cell is initialized by copying the Bit Vector 632 from the ZZT Cache Array Element into the Register Change Bits field and resetting the Valid Bits field and Register Values field to all zeroes. When the appropriate PE sends an update for a register at the LC of the Cell, the value is written into the Register Values field for this LC at this register position and the appropriate bit in the Valid Bits field is turned on.

ZZT RFILE

The ZZT RFILE 650 holds the contents of all registers at the beginning of the Called Segment, which is also the end of the Caller Segment.

Usage of ZZT Structures in E-Mode

During E-Mode execution, the above data structures are used as follows:

1. When we enter into E-Mode execution, the ZZT RFILE contains the valid contents of all registers at the entry point. Initially this is true, as we assume that the ZZT RFILE will be so initialized. Each time we re-enter E-Mode, we will ensure proper setting of the ZZT RFILE by performing the following operation. Using the final LC of the Caller Segment, LCF, and for each register r, a backwards scan from the LCF through the Cells of the ZZT Frame (involving if necessary the ZZT RFILE contents) determines the latest value of each register, which becomes the new value for that register in the ZZT RFILE. This set of values also becomes the initial register values for the Called Segment. The ZZT Scanner 660 performs this scan operation and will wait until the register value required to replace the value in the ZZT RFILE is valid by examining the ZZT Frame Valid Bits 646 for the register r in the Cell with the highest LC that is less than or equal to LCF. The default will be to use the value in the register r that is initially in the ZZT RFILE prior to the scan. This occurs only if there is no change to the register during the entire Caller Segment. The fact that the ZZT Scanner does this operation before issuing the Starting Address of the Called Segment to all PEs is what causes all PEs to synchronize at a transition. The ZZT Scanner receives its activating input from the OLC 540 (FIG. 5D) via Bus 593 and sends the Starting Address of the next P-Segment to all PEs via Bus 215.

2. At the entry point to the next P-Segment, the ZZT Frame is cleared and the first Cell in it will be marked with the current (i.e., the zero-th) Level of Conditionality. As each instruction is executed, the following actions take place:

3. If an instruction accesses a register, which is marked as invalid, a FETCH message is sent to the ZZT RFILE, which returns the initialized register value.

4. If an instruction is the conceptually last instruction to modify a register at a given LC, a message is sent via Bus 135 to the Cell in the ZZT Frame for the current LC. Such a message is illustrated in FIG. 6F and carries the following information:

A Fetch/Store Bit 671 indicating FETCH or STORE and a ZZT Access Bit 672. These two bits in combination allow the Memory Hierarchy Interface 145 to distinguish FETCH from the ZZT RFILE from a STORE to the ZZT Frame and from other FETCHES and STORES to the Memory Hierarchy Interface 145.

Register Name 673

Level of Conditionality (LC) 674

When Bit 671 and Bit 672 indicate that a STORE is to be done into the ZZT Frame, the ZZT Frame Entry for the indicated Register in the indicated Cell is modified as follows: For the modified register, the Register Change Bit in the ZZT Cell 641 for the LC 674 and the Register Name 673 is turned on and the new register contents are written into the corresponding position in the Register Values field.

5. If a branch instruction is executed:
   a. The ZZT Cache Directory is checked for a match with the branch address. If a match occurs, the current Z-Code is recorded and a transition to Z-Code takes place.
   b. If a match does not occur, and it is decided that the Z-Code built so far is long enough, then the Z-Code is terminated and a re-entry to E-Mode is initiated.
6. When a BWG in the E-Mode is recognized, a roll back occurs to the LC preceding that of the wrongly guessed branch. By scanning the Cells in the ZZT Frame backwards from that LC, the correct state of all registers can be determined and they are reset to that state. Execution in the E-Mode continues from the correct target.
7. The recording of Z-Code built up involves the following steps:
   a. A new range of Elements in the ZZT Cache Array is selected for the ZZT Cells 641 having a LC equal to or less than LCF.
   b. The Register Change Bits for each LC equal to or less than LCF are copied from the ZZT Frame into the corresponding Element in the ZZT Cache Array.
   c. The End of Segment Bit 633 in each ZZT Array Element 631 is turned off, except for the last cell which is turned on.
   d. Using Age Tags 628, a ZZT Directory Entry 621 in the ZZT Cache may be purged and a new Entry replaces it.
   e. In this new ZZT Cache Directory Entry, the beginning address of the P-Segment becomes the Starting Address 622 and the ZZT Cache Address 623 is a pointer to the newly created ZZT Cache Array Elements.
8. At the point of the transition, all registers in all of the PEs are set to be invalid so that any use of a register value by a PE will first require that the value be obtained from the ZZT RFILE.

Usage of ZZT Structures in Z-Mode

During Z-Mode, the ZZT data structures are used as follows:
1. When Z-Mode is entered, the ZZT RFILE contains the valid contents of all registers at the entry point. Initially this is true, as we assume that the ZZT RFILE will be so initialized. Each time Z-Mode is re-entered, the ZZT RFILE is properly reset.
2. When Z-Mode is entered, the ZZT Directory Entry provides the ZZT Cache Address which points to the ZZT Array Elements that are loaded into the ZZT Frame. The End of Segment Bit stops the transfer of information. The ZZT Frame is set from the ZZT Cache Array Elements, which are copied into the ZZT Frame, one for each LC. As each instruction is executed, the following actions take place:
3. If a Z-Instruction accesses a register, which is marked as invalid, via the Valid Bit 310 associated with this register, a FETCH message is sent to the ZZT RFILE which returns the initial register value for the Called Segment.
4. If a Z-Instruction is the conceptually last instruction to modify a register at a given LC, the D-List of the instruction includes the ZZT Frame and the message is routed via the MHS through Bus 460 to the ZZT Frame. The message from the PE identifies the Cell in the ZZT Frame by the LC 674 and the register within the Cell by the Register Name 673 within the message. For the modified register, the corresponding bit in the valid Bits field is turned on and the new register contents are written into the corresponding element in the Register Values field.
5. When a BWG is recognized or when the Z-Code ends, the final state is established by updating the ZZT RFILE. Since the ZZT Scanner awaits all relevant register changes and the OLC agreeing with the LC of the BWG assures that all stores have been posted, the completion of all relevant PE activity is assured.
6. Just before starting another mode, all registers in all processors are set to invalid using the Valid Bit 310.

SECTION 7 ASSIGNMENT OF INSTRUCTIONS TO PROCESSING ELEMENTS IN E-MODE

It is sensible that the assignment of instructions to Processing Elements be combined with the decoding function of a Processing Element since the information derived from decoding the instruction serves as the most meaningful input to the assignment decision. FIG. 7 illustrates the elements of the Decoder/Scheduler 700. The Decoder 701 is either presented with the next Z-Instruction from the Z-Cache 200 via Bus 150 or presented with the next instruction from the Memory Hierarchy 140 via Bus 135. The former occurs in Z-Mode and there is no Scheduler 702 operation required. In Z-Mode the action of the Decoder 701 is to process the Instruction Image 222, S-List 223, and D-List 224 (FIG. 2C), and send the derived information to the Execution Units 130 and Register File 300, and to the Memory Hierarchy 140 in the Z-Instruction FETCHES or STORES. In E-Mode the information derived by the Decoder 701 is sent to the Scheduler 702 to determine the assignment of this instruction.

The terminology used in this Section 8 is to call the Assignment Function $\Phi$ so that for the p-th instruction of a P-Segment, $\Phi(p)$ is the name of the Processing Element to which the p-th instruction is assigned. All Processing Elements are identical with the exception of their unique Processing Element Number, and all use the same $\Phi$. Thus no ambiguity arises from the separate evaluations of $\Phi(p)$ even if it is done asynchronously on different Processing Elements.

The inputs to the Scheduler 702 are shown in FIG. 7. As discussed earlier, the OSC/PSC Controls 500 use Bus 705 to communicate the ID of the instructions that caused the hazard. This information allows MSIS to restart following an OSC in a manner which assigns all indicated instructions to the same Processing Element, so as to avoid a repetition of the inter-Processing-Element OSC/PSC hazard. Such information is input to the Scheduler 702 and causes it to over-ride the usual $\Phi$ decisions.

Another possible input to the Scheduler 702 are External Over-Ride Inputs 710. Included in this class of over-rides are:
  A Predefined $\Phi$ 711 for each instruction supplied from an external source,
  Specific Rules 712 that control the assignment by partitioning of the registers among Processing Elements, i.e. defining ownership, and
  A P-Segment Starting Address 713 for starting Z-Code generation at a specific instruction and a P-Segment Terminating Address 714 for stopping Z-Code generation at a specific instruction.

All of these can be created and supplied by another processor which analyzes the overall I-Stream in execution, breaks it up into P-Segments, and instructs MSIS using the aforementioned External Over-Ride Inputs 710.

Another over-ride of the usual Scheduler decision for assignment is an Architectural Over-Rides 760. For processor architectures which have elements of machine state that are not maintained in registers, e.g. condition code, a provision in the Scheduler 700 can be made so that the pair of instructions that mutually depend on each other through the setting and using of such an element are perforce scheduled on the same Processing Element.

In the absence of any such relevant input, the instruction will be assigned based on an Algorithmic Scheduler 740. Any pro-defined algorithm may be used which partitions the code into sequences which are in conceptual sequence with respect to the original program sequence.

In order for the Algorithmic Scheduler to be consistent with Section 8, each Processing Element must maintain a record of the scheduling decision on all Processing Elements at all branch points in the P-Segment. The Scheduler Rollback Controls (SRC) 741 performs this function and it is through SRC that following a roll-back of the schedule, any information needed subsequently by the Scheduler 702 in scheduling decisions is made available. Such a recording is simplified if the assignment function is based on External Over-Ride Inputs or using only those criteria which are evident from the instruction to make the scheduling decision. These criteria include: instruction ID or registers used by the instruction. Algorithmic Schedulers cover a broad range of possibilities. A few simple examples are:

Temporal Scheduling

Consecutive instructions are scheduled on the same Processing Element until some termination criteria is satisfied such as:
- a fixed number of instructions have been scheduled on the same PE, or
- a branch instruction has been taken, or
- a register initiating instruction has been encountered.

The next instruction following the termination is assigned to the next higher numbered Processing Element which is scheduled as specified above. If the Processing Elements are numbered 1 through n, the next higher Processing Element after n is 1.

Spatial Scheduling

This scheduling attempts to reduce messages by determining which registers are set by the instruction to be scheduled and assigning all instructions which set a given register to the same Processing Element. If an instruction sets more than one register and this leads to a scheduling choice between different Processing Elements then a pre-defined tie-breaker is used, i.e. $\Phi(p)$ is the smallest numbered Processing Element.

Complex algorithmic scheduling represents a trade-off between complexity of the Scheduler 702 and the performance achieved. Recall that the occurrence of a BWG takes away the performance advantage of scheduling instructions that conceptually follow the branch on other Processing Elements many cycles before the branch is executed.

To maintain consistency with the rest of the embodiment it is necessary that the scheduling done by the Scheduler 702 be one which maintains conceptual sequence within Processing Elements. Multiple instructions can be scheduled in a single assignment operation if the instructions are presented simultaneously to the Scheduler in all Processing Elements. The assignment in such a situation specifies which Processing Element and in which order the instructions scheduled to the same Processing Element are to be ordered in the Z-Cache Array. However, the requirement of conceptual order within each Processing Element removes this degree of freedom.

Following the assignment of an instruction in the E-Mode the instruction is presented to the Assigned Instruction Processing Unit 751 whose operation is described in Section 8 wherein for all non-assigned Processing Elements a notation is made of the impact of this instruction on the validity of registers and a need for messages to be sent, and on the assigned Processing Elements the garnering of inputs from the Register File 300, the Memory Hierarchy 140, and the execution of the instruction through the Execution Units 130.

SECTION 8 INSTRUCTION PROCESSING

Instruction Attributes

The Instruction Identifier (ID)) 802 (FIG. 2C) and the Level of Conditionality (LC) 502 (FIG. 2C) for each instruction have already been described. An instruction is also associated with another attribute called BWGID, which is the ID of the latest branch instruction that was guessed wrongly. The pair {BWGID,ID} uniquely identifies an instruction. As an example, suppose instructions 3, 6 and 8 were wrongly guessed branches. Then the instructions 1 thru 10 would have the following identifying pairs: {0,1} {0,2} {0,3} {3,4} {3,5} {3,6} {6,7} {6,8} {8,9} {8,10}.

The advantage of this numbering scheme will become clear when we examine how branch wrong guesses are handled later. For now, we observe that because of pipeline organization, a machine may execute instructions {0,4} {0,5} on the wrong branch path, before the result of the branch instruction {0,3} takes effect. If the machine keeps track of the list of currently known branch wrong guesses (0,3,6,8, . . . in this example), then it is easy to recognize valid instructions. An instruction is valid if its BWGID is present in the above list and its ID is not greater than the next BWGID in the list. Thus, instructions {0,4} {0,5} are invalid in the above example.

Register History—R-Lists

Each PE stores the next needed update to any register owned by other PEs in a Register File 300. The structure and operation of the Register File was described in Section 3 and is shown in FIG. 3. An entry in the Register File 2300 is of the form {BWGID,ID,-DATA}. DATA is the contents stored into register r by the instruction {BWGID,ID} and the column position within the Register File identifies the PE that executed this instruction. Sometimes the form {BWGID,ID,?} will be used hereinafter, indicating that instruction {BWGID,ID} will modify the register r, and the actual DATA will be known only in the future. The use of ? is a reference to the invalid value of the cell, that is, the Cell Valid Bit 320 indicates that the those entries marked with a ? are invalid.

Instruction Processing in E-Mode

In E-Mode, each instruction is seen by every PE. An instruction is actually executed only by the PE assigned to it by $\Phi(ID)$. A PE, p, takes the following actions to execute an instruction whose attributes are BWGID,ID,LC and which has S and D as its input and output register sets:

For each PE p, do the following:

A. IF $\Phi(ID)=p$, then do the following:
  1. VALIDATE: For each register r in S,
     a. If R [r,*] is marked as invalid, follow the instructions specified in the portion of Section 6 entitled "Usage of ZZT Structures in Z-Mode". When we enter into E-Mode execution, the ZZT RFILE contains the valid contents of all registers at the entry point. At the point of a transition all registers in all PE are marked invalid and the accessing of any register so set must derive its input from the ZZT RFILE.
     b. Scan the row R [r,*] and find R [r,k] containing {BWGID',ID',DATA}, so that {BWGID',ID'} is the largest tag smaller than {BWGID,ID}.
     c. If k is not p then wait until DATA is not ? and then copy the DATA into R[r,p].
  2. EXECUTE: Based on instruction opcode do the following:
     a. MEMORY FETCH: send request {FETCH,LC,{BWDID,ID},ADDRESS} to the Interface 145 (FIG. 1) and wait until the result is obtained.
     b. MEMORY STORE: send request {STORE,LC,{BWGID,ID},ADDRESS,DATA} to the Interface 145.
     c. BRANCH: send message {BDONE,LC,{BWGID,ID}} via Bus 890 to Pruning Monitor 542. When a BWG, in the E-Mode, is recognized, a roll back occurs to the LC preceding that of the offending branch. By scanning the elements in the ZZT Frame backwards from that LC, the correct state of all registers can be determined and they are reset to that state. Execution in the E-Mode continues from the correct target. If the branch has been guessed wrong, then send the message {BWG,LC,{BWGID,ID},CORRECT-TARGET-ADDRESS} via Bus 890 to Pruning Monitor 542.
     d. OTHER: perform the appropriate logic.
  3. RECORD: Store results (if any) into the destination registers. For each register r in D, replace R [r,p] by {BWGID,ID,DATA}.

If a branch instruction is executed, the ZZT Cache Directory is checked for a match with the branch address. If a match occurs, the current Z-Code is recorded and a transition to Z-Code takes place.
  4. If a match does not occur, and it is decided that the Z-Code built so far is long enough, then the Z-Segment is terminated and a re-entry to E-Mode is initiated.

B. IF $\Phi(ID)$ is not p, then do the following:
  1. SEND: For each register r in S,
     a. Scan the row R [r,*] and find the item R [r,k]={BWGID',ID',DATA} having the highest {BWGID',ID'} smaller than {BWGID,ID}.
     b. If k=p and {r,BWGID',ID',$\Phi(ID)$} is not in the D-list of instruction {BWGID',ID'}, then do:
        1) Send message {r,DATA,BWGID',ID'} to processor $\Phi(ID)$.
        2) Enter {r,BWGID',ID',$\Phi(ID)$} into the D-list of instruction {BWGID',ID'}.
        3) Enter {r,BWGID',ID'} into the S-list of instruction {BWGID,ID}.
  2. RECEIVE: For each register r in D, if the Cell Valid Bit 320 of R [r,$\Phi(ID)$] is not is not ? then replace R [r,$\Phi(ID)$] with {BWGID,ID,?} . The ability of the MHS to anticipate the future need by a PE of a message is a result of the fact that in the E-Mode all PE see all instructions and the PE operate asynchronously. If a message arrives early with respect to the {BWIG, ID} of a given PE, this means that this message is the earliest message from the sending PE that is required by the PE and that any intermediate modifications to this register by that PE need not be recorded.

C. If the instruction is a branch, it is necessary to determine for each register r, which instruction last changes the value of the register at the LC of the branch. The means of doing this parallels the determination of the PE that has last set the value of a register that it must send a message to the PE that is assigned an instruction if another PE has been assigned that instruction. The LC need not be manifest as the algorithm will not send a second message to the ZZT Frame if the ZZT message is already on the D-List of the instruction.

If the instruction decoded is a branch, then for each PE p,
  1. SEND: For all registers r
     a. Scan the row R [r,*] and find the item R [r,k]={BWGID',ID',DATA} having the highest {BWGID',ID'} smaller than {BWGID,ID} of the branch.
     b. If k=p and {r,BWGID',ID',ZZT Frame)} is not in the D-list of instruction {BWGID',ID'}, then do:
        1) Send message {r,DATA,BWGID',ID',LC of the branch} to the ZZT Frame via Bus 110 to the Memory Hierarchy 140. The message will be sent as a ZZT STORE ACCESS as described in Section 6 in the part entitled "Usage of ZZT Structures in E-Mode".
        2) Enter {r,BWGID',ID', ZZT Frame)} into the D-list of instruction {BWGID',ID'}.

Instruction Processing in Z-Mode

In Z-Mode, each instruction is seen only by its assigned processor. A processor, p, takes the following actions to execute an instruction whose attributes are BWGID,ID,LC and which has S and D as its input and output register sets and S-list and D-list from the Z-Code:
  1. SYNCHRONIZE: For each item {r, BWGID',ID'} in its S-list, do:
     a. If the register is marked as invalid,
     b. If a Z-Instruction accesses a register, which is marked as invalid, via the Valid Bit 310 associated with this register, a FETCH message is sent to the ZZT RFILE which returns the initial register value for the Called Segment. The values in the ZZT RFILE are established at a transition as described in Section 6.
     c. Wait until R [r,$\Phi(ID)$]={BWGID',ID',DATA} with DATA not equal to ?.
     d. Load DATA into R [r,p], mark R [r,$\Phi(ID)$] as empty (i.e. ?,?) and signal the Message Handling System to send the next message for this entry.
  2. EXECUTE: Based on instruction opcode do the following:
     a. MEMORY FETCH: send request {FETCH, LC,{BWDID,ID}, ADDRESS} to the OSC Controls 500 and wait until the result is obtained.

b. MEMORY STORE: send request {STORE, LC,{BWGID,ID}, ADDRESS,DATA} to the OSC Controls 500.

c. BRANCH: send message {BDONE,LC,{BWGID,ID}} via Bus 890 to Pruning Monitor 542.

When a BWG is recognized or when the Z-Code ends, the final state is established by updating the ZZT RFILE. As the ZZT Scanner awaits all relevant register changes and the OLC agreeing with the LC of the BWG assures that all stores have been posted, the completion of all relevant PE activity is assured.

If the branch has been guessed wrong, then send the message {BWG,LC,{BWGID,ID},CORRECT-TARGET-ADDRESS} to the ZZT.

d. OTHER: perform the appropriate logic.

3. COMMUNICATE: Store results (if any) into the destination registers. When a BWG is recognized or when the Z-Code ends, the final state is established by updating the ZZT RFILE. As the ZZT Scanner awaits all relevant register changes and the OLC agreeing with the LC of the BWG assures that all stores have been posted, the completion of all relevant PE activity is assured.

4. Just before starting another mode, all registers in all processors are set to invalid using the Valid Bit 310. For each item {r,q} in its D-list, send the message {r,DATA,BWGID,ID} to the processor q.

Processor Actions for Asynchronous Inputs

1. When a message is received for R [r,k] just replace its contents with the message.

SECTION 9 EXTENSIONS TO THE BASIC EMBODIMENT

In what has been detailed in Section 1 to 8, the basic embodiment of MSIS, each Processing Element is involved in a continuing sequence of E-Mode and Z-Mode phases accompanied by the concomitant execution of E-Code and Z-Code. In the discussion of the Decoder 700 in Section 7, a provision was made for External Over-Ride Inputs 710. Included in this class of over-rides are:

A Predefined Φ 711 for each instruction supplied from an external source,

Specific Rules 712 that control the assignment by partitioning of the registers among Processing Elements, i.e. defining ownership, and A P-Segment Starting Address 713 for starting Z-Code generation at a specific instruction and a P-Segment Terminating Address 714 for stopping Z-Code generation at a specific instruction.

All of these can be created and supplied by another processor which analyzes the overall I-Stream in execution, breaks it up into P-Segments, and instructs MSIS using the aforementioned External Over-Ride Inputs 710.

Although MSIS is a stand-alone system, the operation of MSIS as a subsystem under the control of another processor is clearly within the realm of this invention.

In the case of an externally supplied Φ, a requirement exists that, the instructions involved in alternative program segments associated with the BWGs detected in the E-Mode must have a prespecified Φ as well.

Further, the monitoring of MSIS performance by the controlling processor can be used to determine the best manner of Future over-ride with respect to Z-Segments generated, best being specified in terms of improved performance, reduction of messages, or other desiderata.

Within the MSIS organization certain choices have been made and alternatives exist and may be implemented without departing From the basic invention. These include but are not limited to:

a common cache for Z-Code;

using the Memory Hierarchy as the source of the instruction portion of the Z-Code along with additional arrays that are accessed in parallel to supply necessary information for Z-Code processing;

use of relative instruction identifiers, such identifiers being calculatable directly within each Processing Element as the sequence number within the Processing Element;

management of OSC purely based on Level of Conditionality;

use of a common register file for all Processing Elements, such a register file giving to each Processing Element the view of the register file described as Register File 300 and eliminating the need for the MHS;

use of only one of the Processing Elements to do all the execution in the E-Mode while the other Processing Elements are decoding all the instructions and setting up the necessary information in their Z-Caches (The distinction here is that no messages need be sent in the E-Mode. If the means of message handling is changed so that a completed Z-Code is a prerequisite for sending and receiving messages then restricting messages to the Z-Mode is a requirement. The absence of messages in the E-Mode can be used effectively in this situation.);

adding a means for MSIS to start itself (MSIS merely requires an address and way of initializing the registers. If the addressed instruction initializes all the registers with its first few instructions, then MSIS can initialize itself. To do this, an address is sent to all caches in MSIS and everybody agrees it does not match and E-Mode is set. I-Fetching using this address goes to the Memory Hierarchy and E-Mode creates Z-Code and the means to make the transition to the next P-Segment at the end via register contents derived from the ZZT RFILE created during the E-Mode. From then on everything recurs on valid machine states and the whole thing works. The I-Fetch may cause cache faults and page faults and everything else but that is perfectly normal and acceptable.).

Most alternatives require modest modification to the preferred embodiment so as to maintain an overall consistency and correctness.

While the invention has been described in terms of a single preferred embodiment, those skilled in the art will recognize that the invention can be practiced with modification within the spirit and scope of the appended claims.

What is claimed is:

1. A parallelized execution sequence of instructions, said execution sequence being a sequence of instruction addresses and the instructions located at those instruction addresses, comprising:

a plurality of subsequences of instructions, each of said subsequences of instructions being provided for execution concurrently and asynchronously on a separate processing element;

at least some of said subsequences including containing branch instructions;

said branch instruction including the ordinal number of said branch instruction in said execution sequence;

each of said branch instruction including a putative target;

said putative target being said instruction address of the instruction that sequentially follows said branch instruction in said execution sequence;

each said instruction in any one of said subsequences containing information which relates inputs to said subsequence instruction to outputs from subsequence instructions in subsequences other than said any one subsequence;

each said subsequence instruction including said branch number of the branch instruction which is sequentially closest to but ahead of said each subsequence instruction; and, said putative target included with each said branch instruction allowing a processing element which executes any one of said branch instructions to conclude, in the event said executed branch instruction is not taken to the putative target associated with said executed branch instruction, that said executed branch instruction is the last instruction in said execution sequence which can be correctly executed in parallel using said subsequences, the results of said execution of all said subsequence instructions, in all said subsequences, whose branch number is larger than the branch number of said branch instruction not taken to its putative target being ignored.

2. A self-parallelizing digital computer for parallel processing an execution sequence of instructions, comprising:

a plurality of processing elements for executing each of said instructions in said execution sequence either in a first mode of execution or in a second mode of execution;

means for assigning one of said processing elements to each instruction in said execution sequence of instructions, said instructions being distributed among said processing elements;

means in said first mode of execution for uncovering execution dependencies among pairs of said instructions assigned to different processing elements;

means for recording said uncovered execution dependencies, a first part of each said recorded execution dependency being a recorded data sending obligation associated with one of the instructions in each said pair and a second part of each said recorded execution dependency being a recorded data receiving need associated with a second instruction in each said pair;

means for terminating said first mode of execution to define an execution segment (Z-Segment) including at least a portion of the execution sequence of instructions and recorded execution dependencies associated with the portion of the execution sequence of instructions;

means for executing at least a portion of any defined Z-Segment in said second mode of execution, each of said processing elements executing in said second mode of execution only the instructions assigned to said each processing element in said first mode of execution when said executing Z-Segment was defined;

means for terminating execution of a Z-Segment in said second mode of execution after executing at least a portion of said executing Z-Segment;

means for making a determination upon termination of said first mode of execution or termination of said second mode of execution whether a Z-Segment has been defined which can be used to execute the next instruction in said execution sequence; and means responsive to said determination means for making a transition to said second mode of execution for executing said next instruction in the event of determination that a the Z-Segment has been defined and for making a transition to said first mode of execution for executing said next instruction in the event of determination that a usable Z-Segment has not been defined.

3. A self-parallelizing computer as defined in claim 2, wherein each of said plurality of processing elements is an autonomous digital computer.

4. A self-parallelizing computer as defined in claim 2, wherein said plurality of processing elements are substantially identical in both hardware and function.

5. A self-parallelizing computer as defined in claim 2, wherein said plurality of processing elements operate asynchronously with respect to each other.

6. A self-parallelizing computer as defined in claim 2, wherein said means for assigning utilizes an algorithm for making assignment choices.

7. A self-parallelizing computer as defined in claim 6, wherein said means for assigning repeatedly assigns a predetermined number of instructions in an execution sequence to each of said processing elements until all of said instructions have been assigned.

8. A self-parallelizing computer as defined in claim 2, wherein each of said processing elements in said second mode of execution satisfies any recorded data sending obligations associated with instructions assigned to said each processing element and delays execution of any instructions assigned to said each processing element which have an associated recorded data receiving need until said recorded data receiving need is satisfied.

9. A self-parallelizing computer as defined in claim 2, wherein each defined Z-Segment is identified by the address of the first instruction in the execution sequence defined by said Z-Segment.

10. A self-parallelizing computer as defined in claim 2, wherein each of said processing elements in said second mode of execution decodes only instructions in an executing Z-Segment which were assigned to said each processing element in said first mode of execution when said executing Z-Segment was defined.

11. A self-parallelizing computer as defined in claim 2, wherein said means for terminating said first mode of execution ends a first mode of execution always at a branch instruction, whereby an execution sequence defined by a Z-Segment always ends with a branch instruction.

12. A self-parallelizing computer as defined in claim 2, wherein said means for terminating said first mode of execution ends a first mode of execution and thereby defines a Z-Segment when the number of instructions which will be included within the execution sequence defined as a consequence reaches a predetermined number.

13. A self-parallelizing computer as defined in claim 2, wherein said means for terminating said first mode of execution ends a first mode of execution and thereby defines a Z-Segment when the number of branch instructions which will be included within the execution sequence defined as a consequence reaches a predetermined number.

14. A self-parallelizing computer as defined in claim 2, wherein said means for terminating said first mode of execution ends a first mode of execution and thereby defines a Z-Segment when the number of recorded execution dependencies for said Z-Segment to be defined reaches a predetermined number.

15. A self-parallelizing computer as defined in claim 2, wherein said means for terminating said first mode of execution ends said first mode of execution and thereby defines a Z-Segment when the next instruction to be executed is the same instruction which begins an already defined Z-Segment.

16. A self-parallelizing computer as defined in claim 2, wherein said means for making a transition may make a transition from said first mode of execution to said first mode of execution and may make a transition from said second mode of execution to said second mode of execution as well as make a transition between different modes of execution.

17. A self-parallelizing computer as defined in claim 2, wherein said means for terminating said second mode of execution ends said second mode of execution after executing the last instruction in the execution sequence defined by the Z-Segment being executed in said second mode of execution.

18. A self-parallelizing computer as defined in claim 2, wherein said means for terminating said second mode of execution ends said second mode of execution when the next instruction to be executed is not the next instruction in the execution sequence defined by the Z-Segment being executed in said second mode of execution.

19. A self-parallelizing computer as defined in claim 2, wherein:
said instructions in said execution sequence include branch instructions, register value modifying instructions and memory value modifying instructions;
said computer has registers for storing register values and a memory for storing memory values;
said processing elements each have means for detecting said branch instructions and for counting said branch instructions;
said means for uncovering execution dependencies identifies instances where a register set by one of said instructions assigned to one of said processing elements is used by another one of said instructions assigned to another one of said processing elements; and
said means for recording uncovered execution dependencies creates an entry in a first list associated with said register setting instruction that identifies a data sending obligation and creates an entry in a second list associated with said register using instruction that identifies a data receiving need.

20. A self-parallelizing computer as defined in claim 19, wherein said means for uncovering execution dependencies comprises:
means for determining which of said registers are used by each said instruction and which of said registers are set by each said instruction; and
means for determining, for any of said instructions which use a register value, which instruction in said execution sequence created said register value.

21. A self-parallelizing computer as defined in claim 19 wherein said means for making a transition comprises:
means for assigning a level of conditionality to each said instruction, said level of conditionality assigned to each said instruction being derived from a branch instruction count;
means for recording in association with each branch instruction that is executed in said first mode of execution the instruction address to which that branch was taken;
means for determining for each said branch instruction executed in said second mode of execution whether said branch is taken to said address recorded in association with said branch instruction, said branch instruction execution being considered a branch wrong guess whenever it is taken to an instruction address other than said instruction address recorded in association with said branch instruction;
means for determining a certified level of conditionality, said certified level of conditionality being the highest level of conditionality within an executing Z-Segment which represents a point at which all prior branch instructions have been taken to the address recorded in association with said prior branch instruction;
means for recording each said memory value to be stored into said memory by each said memory value modifying instruction, but deferring the storing of each said recorded memory value into said memory at least until the certified level of conditionality becomes as large as the level of conditionality of the memory value modifying instruction that created said recorded memory value;
means for recording at each level of conditionality the final register value for each of said registers which were modified at said each level of conditionality; and
means responsive to said register value recording means and to said memory value recording means for restoring a valid machine state to all of said registers and to said memory, when a branch wrong guess occurs or when execution of a Z-Segment is finished or when a Z-Segment is defined, for presenting said valid machine state to the next instruction to be executed.

22. A self-parallelizing computer as defined in claim 21 wherein said level of conditionality assigned to each said instruction is the number of branch instructions prior to said each instruction.

23. A self-parallelizing computer as defined in claim 21, wherein said means for recording at each level of conditionality the final register value for each of said registers comprises:
means for determining among each set of said instructions that have the same level of conditionality, which of said instructions in said each set was the last instruction to modify each of said registers.

24. A self-parallelizing computer as defined in claim 21, wherein said means for terminating said first mode of execution ends a first mode of execution and thereby defines a Z-Segment whenever the number of levels of conditionality which will be defined as a consequence reaches a predetermined maximum number.

25. A self-parallelizing computer as defined in claim 21 wherein said means for making a transition further comprises:

means for determining a final level of conditionality, said final level of conditionality being the highest certified level of conditionality attained within an executing Z-Segment; and means for updating said memory with said recorded memory values which remain deferred when said final level of conditionality is determined and which were created by a memory value modifying instruction having a level of conditionality no greater than said final level of conditionality.

26. A self-parallelizing, computer as defined in claim 25, wherein:

said level of conditionality assigned to each said instruction is equal to the number of branch instructions prior to said each instruction; and said final level of conditionality is the lower of either one less than the number of executed branches in said Z-Segment being executed in said second mode of execution or the level of conditionality of the sequentially first branch in said executing Z-Segment which is considered a branch wrong guess.

27. A self-parallelizing computer as defied in claim 21 wherein said execution results in either mode of execution are the same for the same execution sequence of instructions because said certified level of conditionality is determined so as to assure that said final level of conditionality will be at least as large as said certified level of conditionality.

28. A self-parallelizing digital computer for parallel processing an execution sequence of instructions which may include branch instructions, register value modifying instructions and memory value modifying instructions, said computer having registers for storing register values and a memory for storing memory values, said computer comprising:

a plurality of processing elements, each off said processing elements having means for detecting said branch instructions and for counting said branch instructions;

means for assigning one of said processing elements to each of said instructions, said instructions being distributed among said processing elements;

means for assigning a level of conditionality to each said instruction, said level of conditionality assigned to each said instruction being derived from a branch instruction count;

means for executing said instructions in a first mode of execution;

said first mode of execution uncovering execution dependencies in which one of said registers is set by a first one of said instructions assigned a first to one of said processing elements and is used a second one of said instructions assigned to a second one of said processing elements;

means for recording said uncovered execution dependencies, a first part of each said execution dependency being a data sending obligation associated with said instruction which set said one register and a second part of each said execution dependency being a data receiving need associated with said a second instruction which used said one register;

means for recording in association with each branch instruction that is executed in said first mode of execution the instruction address to which that branch was taken;

means for terminating said first mode of execution to define a recorded Z-Segment of instructions and associated execution dependencies;

means for executing instructions in recorded Z-Segments in a second mode of execution;

said second mode of execution utilizing a recorded Z-Segment of instructions and associated execution dependencies to execute instructions in said Z-Segment in parallel;

each of said processing elements executing in said second mode of execution only instructions in said Z-Segment assigned to said each processing element;

each of said processing elements satisfying in said second mode of execution any recorded data sending obligations associated with instructions assigned to said each processing element and delaying execution of any instructions assigned to said each processing element which have an associated recorded data receiving need until said recorded data receiving need is satisfied;

means for determining for each said branch instruction executed in said second mode of execution whether said branch is taken to said address recorded in association with said branch instruction, said branch instruction execution being considered a branch wrong guess whenever it is taken to an instruction address other than said instruction address recorded in association with said branch instruction;

means for determining a certified level of conditionality, said certified level of conditionality being the highest level of conditionality within an executing Z-Segment which represents a point at which all prior branch instructions have been taken to the address recorded in association with said prior branch instruction;

means for recording each said memory value to be stored into said memory by each said memory value modifying instruction, but deferring the storing of each said recorded memory value into said memory at least until the certified level of conditionality becomes as large as the level of conditionality of the memory value modifying instruction that created said recorded memory value;

means for recording at each level of conditionality the final register value for each of said registers which were modified at said each level of conditionality; and means responsive to said register value recording means and to said memory value recording means for restoring a valid machine state to all of said registers and to said memory, when a branch wrong guess occurs or when execution of a Z-Segment is finished or when a Z-Segment is defined, for presenting said valid machine state to the next instruction to be executed.

29. A self-parallelizing computer as defined in claim 28 and further comprising:

means for determining which of said registers are used by each said instruction and which of said registers are set by each said instruction;

means for determining, for any of said instructions which use a register value, which instruction in said execution sequence created said register value; and means for determining among each set of said instructions that have the same level of conditionality, which of said instructions in said each set was the last instruction to modify each of said registers.

30. A self-parallelizing computer as defined in claim 28 wherein said level of conditionality assigned to each said instruction is the number of branch instructions prior to said each instruction.

31. A self-parallelizing computer as defined in claim 28 wherein each of said recorded Z-Segments is identified by the address of the first instruction in said each Z-Segment.

32. A self-parallelizing computer as defined in claim 28 wherein each of said processing elements in said second mode of execution decodes only instructions in an executing Z-Segment which were assigned to said each processing element in said first mode of execution when said executing Z-Segment was created and recorded.

33. A self-parallelizing computer as defined in claim 28 and further comprising:
means for determining a final level of conditionality, said final level of conditionality being the highest certified level of conditionality attained within an executing Z-Segment; and
means for updating said memory with said recorded memory values which remain deferred when said final level of conditionality is determined and which were created by a memory value modifying instruction having a level of conditionality no greater than said final level of conditionality.

34. A self-parallelizing computer as defined in claim 33, wherein:
said level of conditionality assigned to each said instruction is equal to the number of branch instructions prior to said each instruction; and
said final level of conditionality is the lower of either one less than the number of executed branches in said Z-Segment being executed in said second mode of execution or the level of conditionality of the sequentially first branch in said executing Z-Segment which is considered a branch wrong guess.

35. A self-parallelizing computer as defined in claim 28 wherein said certified level of conditionality is determined so as to assure that said final level of conditionality will be at least as large as said certified level of conditionality.

36. A self-parallelizing method for parallel processing an execution sequence of instructions, comprising the steps of:
executing each of said instructions in said execution sequence on a plurality of processing elements either in a first mode of execution or in a second mode of execution, the execution results in either mode of execution being the same for the same execution sequence of instructions;
assigning one of said processing elements to each instruction in said execution sequence of instructions, said instructions being distributed among said processing elements;
in said first mode of execution, uncovering execution dependencies among pairs of said instructions assigned to different processing elements;
recording said uncovered execution dependencies, first part of each said recorded execution dependency being a recorded data sending obligation associated with one of the instructions in each said pair and a second part of each said recorded execution dependency being a recorded data receiving need associated with the other instruction in each said pair;
terminating said first mode of execution to define an execution sequence of instructions and recorded execution dependencies associated with said defined execution sequence, said defined execution sequence and associated recorded execution dependencies being considered a Z-Segment;
executing at least a portion of any defined Z-Segment in said second mode of execution, each of said processing elements executing in said second mode of execution only the instructions assigned to said each processing element in said first mode of execution when said executing Z-Segment was defined:
terminating execution or a Z-Segment in said second mode of execution after executing at least a portion of said executing Z-Segment;
making a determination upon termination of said first mode of execution or termination of said second mode of execution whether a Z-Segment has been defined which can be used to execute the next instruction in said execution sequence;
executing said next instruction in said second mode of execution in the event of determining that a usable Z-Segment has been defined; and
executing said next instruction in said first mode of execution in the event of determining that a usable Z-Segment has not been defined.

37. A self-parallelizing method for parallel processing, as defined in claim 36, wherein said instructions are executed on said processing elements asynchronously with respect to each other.

38. A self-parallelizing method for parallel processing, as defined in claim 36, wherein each of said processing elements in said second mode of execution satisfies any recorded data sending obligations associated with instructions assigned to said each processing element and delays execution of any instructions assigned to said each processing element which have an associated recorded data receiving need until said recorded data receiving need is satisfied.

39. A self-parallelizing method for parallel processing, as defined in claim 36, wherein each of said processing elements in said second mode of execution decodes only instructions in an executing Z-Segment which were assigned to said each processing 40. A self-parallelizing digital computer for parallel processing an execution sequence of instructions, comprising:
(a) a plurality of processing elements;
(b) assignment means for assigning a processing element in said plurality to each instruction in the execution sequence;
(c) each of said processing elements including first means for executing the instructions in a first mode wherein all of the instructions in the execution sequence are decoded but only instructions assigned to the processing element are executed; and, second means for executing the instructions in a second mode wherein only the instructions assigned to the processing element are decoded and executed;
(d) each of said processing elements further including recordation means, coupled to the first means, for recording execution dependencies uncovered during execution of the instructions in the first mode and for providing the second means with data indicative of the execution dependencies;

(e) determination means, coupled to the processing elements, for determining whether at least one of said processing elements can successfully execute a given instruction in said execution sequence in said second mode; and, (f) mode transition means, responsive to said determination means, for causing the at least one of said processing elements to process said given instruction said second mode in the event a determination is made that said given instruction can be successfully executed in said second mode and for otherwise causing said at least one processing element to process said given instruction in said first mode.

* * * * *